(12) United States Patent
Paik

(10) Patent No.: US 7,221,990 B2
(45) Date of Patent: *May 22, 2007

(54) PROCESS CONTROL BY DISTINGUISHING A WHITE NOISE COMPONENT OF A PROCESS VARIANCE

(75) Inventor: Young J. Paik, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/398,673

(22) Filed: Apr. 6, 2006

(65) Prior Publication Data

US 2006/0195214 A1    Aug. 31, 2006

Related U.S. Application Data

(63) Continuation of application No. 10/856,016, filed on May 28, 2004, now Pat. No. 7,096,085.

(51) Int. Cl.
*G06F 19/00* (2006.01)
(52) U.S. Cl. .................. 700/109; 700/121; 702/84
(58) Field of Classification Search ................. 700/121, 700/108, 109, 31, 28, 71; 702/84
See application file for complete search history.

(56) References Cited

U.S. PATENT DOCUMENTS 3,205,485 A    9/1965    Noltingk (Continued)

FOREIGN PATENT DOCUMENTS

CA    2050247    8/1991

(Continued)

OTHER PUBLICATIONS

1999. "Contactless Bulk Resistivity/Sheet Resistance Measurement and Mapping Systems." www.Lehighton.com/fattech!index.html.
2000. "Microsense II Capacitance Gaging System." www.adetech.com.
2002. "Microsence II&madash;5810: Non-Contact Capacitance Gaging Module." www.adetech.com
"3D optical profilometer MicroXAM by ADE Phase Shift." Printed Dec. 9, 2003. http://www.phase-shift.com/microxam.shtml.

(Continued)

*Primary Examiner*—Leo Picard
*Assistant Examiner*—Steven R. Garland
(74) *Attorney, Agent, or Firm*—WilmerHale

(57) ABSTRACT

A method, system and medium is provided for enabling improved control systems. An error, or deviation from a target result, is observed for example during manufacture of semiconductor chips. The error within standard deviation is caused by two components: a white noise component and a signal component (such as systematic errors). The white noise component is, e.g., random noise and therefore is relatively non-controllable. The systematic error component, in contrast, may be controlled by changing the control parameters. A ratio between the two components is calculated autoregressively. Based on the ratio and using the observed or measured error, the actual value of the error caused by the systematic component is calculated utilizing an autoregressive stochastic sequence. The actual value of the error is then used in determining when and how to change the control parameters. The autoregressive stochastic sequence addresses the issue of the effects of run-to-run deviations, and provides a mechanism that can extract the white noise component from the statistical process variance in real time. This results in an ability to provide tighter control, for example in feedback and feedforward variations of process control.

32 Claims, 7 Drawing Sheets

U.S. PATENT DOCUMENTS

| | | |
|---|---|---|
| 3,208,485 A | 9/1965 | Tiffany |
| 3,229,198 A | 1/1966 | Libby |
| 3,767,900 A | 10/1973 | Chao et al. |
| 3,920,965 A | 11/1975 | Sohrwardy |
| 4,000,458 A | 12/1976 | Miller et al. |
| 4,207,520 A | 6/1980 | Flora et al. |
| 4,209,744 A | 6/1980 | Gerasimov et al. |
| 4,302,721 A | 11/1981 | Urbanek et al. |
| 4,368,510 A | 1/1983 | Anderson |
| 4,609,870 A | 9/1986 | Lale et al. |
| 4,616,308 A | 10/1986 | Morshedi et al. |
| 4,663,703 A | 5/1987 | Axelby et al. |
| 4,698,766 A | 10/1987 | Entwistle et al. |
| 4,750,141 A | 6/1988 | Judell et al. |
| 4,755,753 A | 7/1988 | Chern |
| 4,757,259 A | 7/1988 | Charpentier |
| 4,796,194 A | 1/1989 | Atherton |
| 4,901,218 A | 2/1990 | Cornwell |
| 4,938,600 A | 7/1990 | Into |
| 4,957,605 A | 9/1990 | Hurwitt et al. |
| 4,967,381 A | 10/1990 | Lane et al. |
| 5,089,970 A | 2/1992 | Lee et al. |
| 5,108,570 A | 4/1992 | Wang |
| 5,208,765 A | 5/1993 | Turnbull |
| 5,220,517 A | 6/1993 | Sierk et al. |
| 5,226,118 A | 7/1993 | Baker et al. |
| 5,231,585 A | 7/1993 | Kobayashi et al. |
| 5,236,868 A | 8/1993 | Nulman |
| 5,240,552 A | 8/1993 | Yu et al. |
| 5,260,868 A | 11/1993 | Gupta et al. |
| 5,270,222 A | 12/1993 | Moslehi |
| 5,283,141 A | 2/1994 | Yoon et al. |
| 5,295,242 A | 3/1994 | Mashruwala et al. |
| 5,309,221 A | 5/1994 | Fischer et al. |
| 5,329,463 A | 7/1994 | Sierk et al. |
| 5,338,630 A | 8/1994 | Yoon et al. |
| 5,347,446 A | 9/1994 | Iino et al. |
| 5,367,624 A | 11/1994 | Cooper |
| 5,369,544 A | 11/1994 | Mastrangelo |
| 5,375,064 A | 12/1994 | Bollinger |
| 5,398,336 A | 3/1995 | Tantry et al. |
| 5,402,367 A | 3/1995 | Sullivan et al. |
| 5,408,405 A | 4/1995 | Mozumder et al. |
| 5,410,473 A | 4/1995 | Kaneko et al. |
| 5,420,796 A | 5/1995 | Weling et al. |
| 5,427,878 A | 6/1995 | Corliss |
| 5,444,837 A | 8/1995 | Bomans et al. |
| 5,469,361 A | 11/1995 | Moyne |
| 5,485,082 A | 1/1996 | Wisspeintner et al. |
| 5,490,097 A | 2/1996 | Swenson et al. |
| 5,495,417 A | 2/1996 | Fuduka et al. |
| 5,497,316 A | 3/1996 | Sierk et al. |
| 5,497,381 A | 3/1996 | O'Donoghue et al. |
| 5,503,707 A | 4/1996 | Maung et al. |
| 5,508,947 A | 4/1996 | Sierk et al. |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,534,289 A | 7/1996 | Bilder et al. |
| 5,541,510 A | 7/1996 | Danielson |
| 5,546,312 A | 8/1996 | Mozumder et al. |
| 5,553,195 A | 9/1996 | Meijer |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,627,083 A | 5/1997 | Tounai |
| 5,629,216 A | 5/1997 | Wijaranakula et al. |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,655,951 A | 8/1997 | Meikle et al. |
| 5,657,254 A | 8/1997 | Sierk et al. |
| 5,661,669 A | 8/1997 | Mozumder et al. |
| 5,663,797 A | 9/1997 | Sandhu |
| 5,664,987 A | 9/1997 | Renteln |
| 5,665,199 A | 9/1997 | Sahota et al. |
| 5,665,214 A | 9/1997 | Iturralde |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. |
| 5,695,810 A | 12/1997 | Dubin et al. |
| 5,698,989 A | 12/1997 | Nulman |
| 5,719,495 A | 2/1998 | Moslehi |
| 5,719,796 A | 2/1998 | Chen |
| 5,735,055 A | 4/1998 | Hochbein et al. |
| 5,740,033 A | 4/1998 | Wassick et al. |
| 5,740,429 A | 4/1998 | Wang et al. |
| 5,751,582 A | 5/1998 | Saxena et al. |
| 5,754,297 A | 5/1998 | Nulman |
| 5,761,064 A | 6/1998 | La et al. |
| 5,761,065 A | 6/1998 | Kittler et al. |
| 5,764,543 A | 6/1998 | Kennedy |
| 5,777,901 A | 7/1998 | Berezin et al. |
| 5,787,021 A | 7/1998 | Samaha |
| 5,787,269 A | 7/1998 | Hyodo |
| 5,808,303 A | 9/1998 | Schlagheck et al. |
| 5,812,407 A | 9/1998 | Sato et al. |
| 5,823,854 A | 10/1998 | Chen |
| 5,824,599 A | 10/1998 | Schacham-Diamand et al. |
| 5,825,356 A | 10/1998 | Habib et al. |
| 5,825,913 A | 10/1998 | Rostami et al. |
| 5,828,778 A | 10/1998 | Hagi et al. |
| 5,831,851 A | 11/1998 | Eastburn et al. |
| 5,832,224 A | 11/1998 | Fehskens et al. |
| 5,838,595 A | 11/1998 | Sullivan et al. |
| 5,838,951 A | 11/1998 | Song |
| 5,844,554 A | 12/1998 | Geller et al. |
| 5,857,258 A | 1/1999 | Penzes et al. |
| 5,859,777 A | 1/1999 | Yokoyama et al. |
| 5,859,964 A | 1/1999 | Wang et al. |
| 5,859,975 A | 1/1999 | Brewer et al. |
| 5,862,054 A | 1/1999 | Li |
| 5,863,807 A | 1/1999 | Jang et al. |
| 5,867,389 A | 2/1999 | Hamada et al. |
| 5,870,306 A | 2/1999 | Harada |
| 5,871,805 A | 2/1999 | Lemelson |
| 5,883,437 A | 3/1999 | Maruyama et al. |
| 5,889,991 A | 3/1999 | Consolatti et al. |
| 5,901,313 A | 5/1999 | Wolf et al. |
| 5,903,455 A | 5/1999 | Sharpe, Jr. et al. |
| 5,910,011 A | 6/1999 | Cruse |
| 5,910,846 A | 6/1999 | Sandhu |
| 5,912,678 A | 6/1999 | Saxena et al. |
| 5,916,016 A | 6/1999 | Bothra |
| 5,923,553 A | 7/1999 | Yi |
| 5,926,690 A | 7/1999 | Toprac et al. |
| 5,930,138 A | 7/1999 | Lin et al. |
| 5,940,300 A | 8/1999 | Ozaki |
| 5,943,237 A | 8/1999 | Van Boxem |
| 5,943,550 A | 8/1999 | Fulford, Jr. et al. |
| 5,960,185 A | 9/1999 | Nguyen |
| 5,960,214 A | 9/1999 | Sharpe, Jr. et al. |
| 5,961,369 A | 10/1999 | Bartels et al. |
| 5,963,881 A | 10/1999 | Kahn et al. |
| 5,975,994 A | 11/1999 | Sandhu et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,012,048 A | 1/2000 | Gustin et al. |

| | | | | | | |
|---|---|---|---|---|---|---|
| 6,017,771 | A | 1/2000 | Yang et al. | 6,278,899 B1 | 8/2001 | Piche et al. |
| 6,036,349 | A | 3/2000 | Gombar | 6,280,289 B1 | 8/2001 | Wiswesser et al. |
| 6,037,664 | A | 3/2000 | Zhao et al. | 6,281,127 B1 | 8/2001 | Shue |
| 6,041,263 | A | 3/2000 | Boston et al. | 6,284,622 B1 | 9/2001 | Campbell et al. |
| 6,041,270 | A | 3/2000 | Steffan et al. | 6,287,879 B1 | 9/2001 | Gonzales et al. |
| 6,054,379 | A | 4/2000 | Yau et al. | 6,290,572 B1 | 9/2001 | Hofmann |
| 6,059,636 | A | 5/2000 | Inaba et al. | 6,291,367 B1 | 9/2001 | Kelkar |
| 6,064,759 | A | 5/2000 | Buckley et al. | 6,292,708 B1 | 9/2001 | Allen et al. |
| 6,072,313 | A | 6/2000 | Li et al. | 6,298,274 B1 | 10/2001 | Inoue |
| 6,074,443 | A | 6/2000 | Venkatesh et al. | 6,298,470 B1 | 10/2001 | Breiner et al. |
| 6,077,412 | A | 6/2000 | Ting et al. | 6,303,395 B1 | 10/2001 | Nulman |
| 6,078,845 | A | 6/2000 | Friedman | 6,304,999 B1 | 10/2001 | Toprac et al. |
| 6,094,688 | A | 7/2000 | Mellen-Garnett et al. | 6,307,628 B1 | 10/2001 | Lu et al. |
| 6,096,649 | A | 8/2000 | Jang | 6,314,379 B1 | 11/2001 | Hu et al. |
| 6,097,887 | A | 8/2000 | Hardikar et al. | 6,317,643 B1 | 11/2001 | Dmochowski |
| 6,100,195 | A | 8/2000 | Chan et al. | 6,320,655 B1 | 11/2001 | Matsushita et al. |
| 6,108,092 | A | 8/2000 | Sandhu | 6,324,481 B1 | 11/2001 | Atchison et al. |
| 6,111,634 | A | 8/2000 | Pecen et al. | 6,334,807 B1 | 1/2002 | Lebel et al. |
| 6,112,130 | A | 8/2000 | Fukuda et al. | 6,336,841 B1 | 1/2002 | Chang |
| 6,113,462 | A | 9/2000 | Yang | 6,339,727 B1 | 1/2002 | Ladd |
| 6,114,238 | A | 9/2000 | Liao | 6,340,602 B1 | 1/2002 | Johnson et al. |
| 6,127,263 | A | 10/2000 | Parikh | 6,345,288 B1 | 2/2002 | Reed et al. |
| 6,128,016 | A | 10/2000 | Coelho et al. | 6,345,315 B1 | 2/2002 | Mishra |
| 6,136,163 | A | 10/2000 | Cheung et al. | 6,346,426 B1 | 2/2002 | Toprac et al. |
| 6,141,660 | A | 10/2000 | Bach et al. | 6,355,559 B1 | 3/2002 | Havemann et al. |
| 6,143,646 | A | 11/2000 | Wetzel | 6,360,133 B1 | 3/2002 | Campbell et al. |
| 6,148,099 | A | 11/2000 | Lee et al. | 6,360,184 B1 | 3/2002 | Jacquez |
| 6,148,239 | A | 11/2000 | Funk et al. | 6,363,294 B1 | 3/2002 | Coronel et al. |
| 6,148,246 | A | 11/2000 | Kawazome | 6,366,934 B1 | 4/2002 | Cheng et al. |
| 6,150,270 | A | 11/2000 | Matsuda et al. | 6,368,879 B1 | 4/2002 | Toprac |
| 6,157,864 | A | 12/2000 | Schwenke et al. | 6,368,883 B1 | 4/2002 | Bode et al. |
| 6,159,075 | A | 12/2000 | Zhang | 6,368,884 B1 | 4/2002 | Goodwin et al. |
| 6,159,644 | A | 12/2000 | Satoh et al. | 6,379,980 B1 | 4/2002 | Toprac |
| 6,161,054 | A | 12/2000 | Rosenthal et al. | 6,381,564 B1 | 4/2002 | Davis et al. |
| 6,169,931 | B1 | 1/2001 | Runnels | 6,388,253 B1 | 5/2002 | Su |
| 6,172,756 | B1 | 1/2001 | Chalmers et al. | 6,389,491 B1 | 5/2002 | Jacobson et al. |
| 6,173,240 | B1 | 1/2001 | Sepulveda et al. | 6,391,780 B1 | 5/2002 | Shih et al. |
| 6,175,777 | B1 | 1/2001 | Kim | 6,395,152 B1 | 5/2002 | Wang |
| 6,178,390 | B1 | 1/2001 | Jun | 6,397,114 B1 | 5/2002 | Eryurek et al. |
| 6,181,013 | B1 | 1/2001 | Liu et al. | 6,400,162 B1 | 6/2002 | Mallory et al. |
| 6,183,345 | B1 | 2/2001 | Kamono et al. | 6,405,096 B1 | 6/2002 | Toprac et al. |
| 6,185,324 | B1 | 2/2001 | Ishihara et al. | 6,405,144 B1 | 6/2002 | Toprac et al. |
| 6,191,864 | B1 | 2/2001 | Sandhu | 6,417,014 B1 | 7/2002 | Lam et al. |
| 6,192,291 | B1 | 2/2001 | Kwon | 6,427,093 B1 | 7/2002 | Toprac |
| 6,197,604 | B1 | 3/2001 | Miller et al. | 6,432,728 B1 | 8/2002 | Tai et al. |
| 6,204,165 | B1 | 3/2001 | Ghoshal | 6,435,952 B1 | 8/2002 | Boyd et al. |
| 6,210,983 | B1 | 4/2001 | Atchison et al. | 6,438,438 B1 | 8/2002 | Takagi et al. |
| 6,211,094 | B1 | 4/2001 | Jun et al. | 6,440,295 B1 | 8/2002 | Wang |
| 6,212,961 | B1 | 4/2001 | Dvir | 6,442,496 B1 | 8/2002 | Pasadyn et al. |
| 6,214,734 | B1 | 4/2001 | Bothra et al. | 6,449,524 B1 | 9/2002 | Miller et al. |
| 6,217,412 | B1 | 4/2001 | Campbell et al. | 6,455,415 B1 | 9/2002 | Lopatin et al. |
| 6,219,711 | B1 | 4/2001 | Chari | 6,455,937 B1 | 9/2002 | Cunningham |
| 6,222,936 | B1 | 4/2001 | Phan et al. | 6,465,263 B1 | 10/2002 | Coss, Jr. et al. |
| 6,226,563 | B1 | 5/2001 | Lim | 6,470,230 B1 | 10/2002 | Toprac et al. |
| 6,226,792 | B1 | 5/2001 | Goiffon et al. | 6,479,902 B1 | 11/2002 | Lopatin et al. |
| 6,228,280 | B1 | 5/2001 | Li et al. | 6,479,990 B2 | 11/2002 | Mednikov et al. |
| 6,230,069 | B1 | 5/2001 | Campbell et al. | 6,482,660 B2 | 11/2002 | Conchieri et al. |
| 6,236,903 | B1 | 5/2001 | Kim et al. | 6,484,064 B1 | 11/2002 | Campbell |
| 6,237,050 | B1 | 5/2001 | Kim et al. | 6,486,492 B1 | 11/2002 | Su |
| 6,240,330 | B1 | 5/2001 | Kurtzberg et al. | 6,492,281 B1 | 12/2002 | Song et al. |
| 6,240,331 | B1 | 5/2001 | Yun | 6,495,452 B1 | 12/2002 | Shih |
| 6,245,581 | B1 | 6/2001 | Bonser et al. | 6,503,839 B2 | 1/2003 | Gonzales et al. |
| 6,246,972 | B1 | 6/2001 | Klimasauskas | 6,515,368 B1 | 2/2003 | Lopatin et al. |
| 6,248,602 | B1 | 6/2001 | Bode et al. | 6,517,413 B1 | 2/2003 | Hu et al. |
| 6,249,712 | B1 | 6/2001 | Boiquaye | 6,517,414 B1 | 2/2003 | Tobin et al. |
| 6,252,412 | B1 | 6/2001 | Talbot et al. | 6,528,409 B1 | 3/2003 | Lopatin et al. |
| 6,253,366 | B1 | 6/2001 | Mutschler, III | 6,529,789 B1 | 3/2003 | Campbell et al. |
| 6,259,160 | B1 | 7/2001 | Lopatin et al. | 6,532,555 B1 | 3/2003 | Miller et al. |
| 6,263,255 | B1 | 7/2001 | Tan et al. | 6,535,783 B1 | 3/2003 | Miller et al. |
| 6,268,270 | B1 | 7/2001 | Scheid et al. | 6,537,912 B1 | 3/2003 | Agarwal |
| 6,271,670 | B1 | 8/2001 | Caffey | 6,539,267 B1 | 3/2003 | Eryurek et al. |
| 6,276,989 | B1 | 8/2001 | Campbell et al. | 6,540,591 B1 | 4/2003 | Pasadyn et al. |
| 6,277,014 | B1 | 8/2001 | Chen et al. | 6,541,401 B1 | 4/2003 | Herner et al. |

| | | |
|---|---|---|
| 6,546,508 B1 | 4/2003 | Sonderman et al. |
| 6,556,881 B1 | 4/2003 | Miller |
| 6,560,504 B1 | 5/2003 | Goodwin et al. |
| 6,563,308 B2 | 5/2003 | Nagano et al. |
| 6,567,717 B2 | 5/2003 | Krivokapic et al. |
| 6,580,958 B1 | 6/2003 | Takano |
| 6,587,744 B1 | 7/2003 | Stoddard et al. |
| 6,590,179 B2 | 7/2003 | Tanaka et al. |
| 6,604,012 B1 | 8/2003 | Cho et al. |
| 6,605,549 B2 | 8/2003 | Leu et al. |
| 6,607,976 B2 | 8/2003 | Chen et al. |
| 6,609,946 B1 | 8/2003 | Tran |
| 6,616,513 B1 | 9/2003 | Osterheld |
| 6,618,692 B2 | 9/2003 | Takahashi et al. |
| 6,624,075 B1 | 9/2003 | Lopatin et al. |
| 6,625,497 B2 | 9/2003 | Fairbairn et al. |
| 6,630,741 B1 | 10/2003 | Lopatin et al. |
| 6,640,151 B1 | 10/2003 | Somekh et al. |
| 6,652,355 B2 | 11/2003 | Wiswesser et al. |
| 6,660,633 B1 | 12/2003 | Lopatin et al. |
| 6,678,570 B1 | 1/2004 | Pasadyn et al. |
| 6,684,114 B1 | 1/2004 | Erickson et al. |
| 6,708,074 B1 | 3/2004 | Chi et al. |
| 6,708,075 B2 | 3/2004 | Sonderman et al. |
| 6,725,402 B1 | 4/2004 | Coss, Jr. et al. |
| 6,728,587 B2 | 4/2004 | Goldman et al. |
| 6,735,492 B2 | 5/2004 | Conrad et al. |
| 6,748,280 B1 | 6/2004 | Zou et al. |
| 6,751,518 B1 | 6/2004 | Sonderman et al. |
| 6,766,214 B1 | 7/2004 | Wang et al. |
| 6,774,998 B1 | 8/2004 | Wright et al. |
| 6,961,626 B1 * | 11/2005 | Paik ........................... 700/31 |
| 2001/0001755 A1 | 5/2001 | Sandhu et al. |
| 2001/0003084 A1 | 6/2001 | Finarov |
| 2001/0006873 A1 | 7/2001 | Moore |
| 2001/0030366 A1 | 10/2001 | Nakano et al. |
| 2001/0039462 A1 | 11/2001 | Dmockowski |
| 2001/0040997 A1 | 11/2001 | Tsap et al. |
| 2001/0042690 A1 | 11/2001 | Talieh |
| 2001/0044667 A1 | 11/2001 | Nakano et al. |
| 2002/0032499 A1 | 3/2002 | Wilson et al. |
| 2002/0058460 A1 | 5/2002 | Lee et al. |
| 2002/0070126 A1 | 6/2002 | Sato et al. |
| 2002/0077031 A1 | 6/2002 | Johannson et al. |
| 2002/0081951 A1 | 6/2002 | Boyd et al. |
| 2002/0089676 A1 | 7/2002 | Pecen et al. |
| 2002/0102853 A1 | 8/2002 | Li et al. |
| 2002/0107599 A1 | 8/2002 | Patel et al. |
| 2002/0107604 A1 | 8/2002 | Riley et al. |
| 2002/0113039 A1 | 8/2002 | Mok et al. |
| 2002/0127950 A1 | 9/2002 | Hirose et al. |
| 2002/0128805 A1 | 9/2002 | Goldman et al. |
| 2002/0149359 A1 | 10/2002 | Crouzen et al. |
| 2002/0165636 A1 | 11/2002 | Hasan |
| 2002/0183986 A1 | 12/2002 | Stewart et al. |
| 2002/0185658 A1 | 12/2002 | Inoue et al. |
| 2002/0193899 A1 | 12/2002 | Shanmugasundram et al. |
| 2002/0193902 A1 | 12/2002 | Shanmugasundram et al. |
| 2002/0197745 A1 | 12/2002 | Shanmugasundram et al. |
| 2002/0197934 A1 | 12/2002 | Paik |
| 2002/0199082 A1 | 12/2002 | Shanmugasundram et al. |
| 2003/0017256 A1 | 1/2003 | Shimane |
| 2003/0020909 A1 | 1/2003 | Adams et al. |
| 2003/0020928 A1 | 1/2003 | Ritzdorf et al. |
| 2003/0154062 A1 | 8/2003 | Daft et al. |
| 2004/0073319 A1 | 4/2004 | Monari |
| 2004/0107895 A1 | 6/2004 | Takahashi et al. |
| 2004/0267395 A1 | 12/2004 | Discenzo et al. |
| 2005/0267607 A1 * | 12/2005 | Paik ........................... 700/31 |
| 2005/0278051 A1 * | 12/2005 | Paik ........................... 700/108 |

FOREIGN PATENT DOCUMENTS

| | | |
|---|---|---|
| CA | 2165847 | 8/1991 |
| CA | 2194855 | 8/1991 |
| EP | 0 397 924 | 11/1990 |
| EP | 0 621 522 | 10/1994 |
| EP | 0 747 795 | 12/1996 |
| EP | 0 869 652 | 10/1998 |
| EP | 0 877 308 | 11/1998 |
| EP | 0 881 040 | 12/1998 |
| EP | 0 895 145 | 2/1999 |
| EP | 0 910 123 | 4/1999 |
| EP | 0 932 194 | 7/1999 |
| EP | 0 932 195 | 7/1999 |
| EP | 1 066 925 | 1/2001 |
| EP | 1 067 757 | 1/2001 |
| EP | 1 071 128 | 1/2001 |
| EP | 1 083 470 | 3/2001 |
| EP | 1 092 505 | 4/2001 |
| EP | 1 072 967 | 11/2001 |
| EP | 1 182 526 | 2/2002 |
| GB | GB-2 347 885 | 9/2000 |
| GB | 2 365 2153 | 2/2002 |
| JP | 61-66104 | 4/1986 |
| JP | 61-171147 | 8/1986 |
| JP | 01-283934 | 11/1989 |
| JP | 3-202710 | 9/1991 |
| JP | 05-151231 | 6/1993 |
| JP | 05-216896 | 8/1993 |
| JP | 05-266029 | 10/1993 |
| JP | 06-110894 | 4/1994 |
| JP | 06-176994 | 6/1994 |
| JP | 06184434 | 7/1994 |
| JP | 06-252236 | 9/1994 |
| JP | 06-260380 | 9/1994 |
| JP | 8-23166 | 1/1996 |
| JP | 08-50161 | 2/1996 |
| JP | 08-149583 | 6/1996 |
| JP | 08-304023 | 11/1996 |
| JP | 09-34535 | 2/1997 |
| JP | 9-246547 | 9/1997 |
| JP | 10-34522 | 2/1998 |
| JP | 10173029 | 6/1998 |
| JP | 11-67853 | 3/1999 |
| JP | 11-126816 | 5/1999 |
| JP | 11-135601 | 5/1999 |
| JP | 2000/-183001 | 6/2000 |
| JP | WO-00/5432/5 | 9/2000 |
| JP | 2001-76982 | 3/2001 |
| JP | 2001/-284299 | 10/2001 |
| JP | 2001/-305108 | 10/2001 |
| JP | 2002-9030 | 1/2002 |
| JP | 2002/-343754 | 11/2002 |
| TW | 434103 | 5/2001 |
| TW | 436383 | 5/2001 |
| TW | 455938 | 9/2001 |
| TW | 455976 | 9/2001 |
| WO | WO-95/3486/6 | 12/1995 |
| WO | WO-980506/6 | 2/1998 |
| WO | WO-98/4509/0 | 10/1998 |
| WO | WO-99/0937/1 | 2/1999 |
| WO | WO-99/2552/0 | 5/1999 |
| WO | WO-99/5920/0 | 11/1999 |
| WO | WO-00/1187/4 | 1/2000 |
| WO | WO-00/0575/9 | 2/2000 |
| WO | WO-11/3506/3 | 6/2000 |
| WO | WO-00/7935/5 | 12/2000 |
| WO | WO-01/1167/9 | 2/2001 |
| WO | WO-01/1586/5 | 3/2001 |
| WO | WO-01/1862/3 | 3/2001 |
| WO | WO-01/2586/5 | 4/2001 |

| | | |
|---|---|---|
| WO | WO-01/3327/7 | 5/2001 |
| WO | WO-01/3350/1 | 5/2001 |
| WO | WO-01/5205/5 | 7/2001 |
| WO | WO-01/5231/9 | 7/2001 |
| WO | WO-01/5782/3 | 8/2001 |
| WO | WO-01/8030/6 | 10/2001 |
| WO | WO-02/1715/0 | 2/2002 |
| WO | WO-02/3161/3 | 4/2002 |
| WO | WO-02/3373/7 | 4/2002 |
| WO | WO-02/074491 | 9/2002 |

OTHER PUBLICATIONS

ACM Research Inc. 2000. "Advanced Copper Metallization for 0.13 to 0.05 & Beyond." http://acmrc.com/press/ACM-ECP-brochure.

ACM Research, Inc. 2002. "ACM Ultra ECP System: Electro-Copper Plating (ECP) Deposition" www.acmrc.com/ecp.html.

Adams, Bret W., Bogdan Swedek, Rajeev Bajah, Fritz Redeker, Manush Birang, and Gregory Amico. "Full-Wafer Endpoint Detection Improves Process Control in Copper CMP." Semiconductor Fabech 12[12] Edition. Applied Materials, Inc., Santa Clara, CA.

"ADE Technologies, Inc. 6360," Printed Dec. 9, 2003. http://www.adetech.com/6360.shtml.

Applied Materials, Inc. 2002. "Applied Materials: Information for Everyone: Cooper Electrochemical Plating." www.appliedmaterials.com/products.copper_plating.html.

Apr. 22, 2004. Office Action for U.S. Appl. No 09/998,372, filed Nov. 30, 2001.

Apr. 28, 2004. Written Opinion for PCT/US02/19117.

Apr. 29, 2004: Written Opinion for PCT/US02/19061.

Apr. 9, 2003. Office Action for U.S. Appl. No. 09/928,474, filed Aug. 14, 2001.

Apr. 9, 2004. Written Opinion for PCT/US02/19116.

Aug. 1, 2003. Written Opinion for PCT/US01/27406.

Aug. 18, 2004. International Preliminary Examination Report for PCT Appl. No PCT/US02/19116.

Aug. 2, 2004. Office Action for U.S. Appl. No. 10/174,377, filed Jun. 18, 2002.

Aug. 20, 2003. Written Opinion for PCT/US01/22833.

Aug. 24, 2004, Office Action for U.S. Appl. No. 10/135,405, filed May 1, 2002.

Aug. 25, 2003. Office Action for U.S. Appl. No. 10/100,184, filed Mar. 19, 2002.

Aug. 25, 2004. Office Action for U.S. Appl. No. 09/998,384, filed Nov. 30, 2001.

Aug. 8, 2003. PCT International Search Report from PCT/US03/08513.

Aug. 9, 2004. Written Opinion for PCT Appl. No. PCT/US02/19063.

Baliga, John. Jul. 1999. "Advanced Process Control: Soon to be a Must." Cahners Semiconductor International. www.semiconductor.net/semiconductor/issues/1999.jul99/docs/feature1.asp.

Berman, Mike, Thomas Bibby, and Alan Smith. "Review of In Situ & In-line Detection for CMP Applications." Semiconductor Fabtech, 8th Edition, pp. 267-274.

Boning, Duane S., Jerry Stefani, and Stephanie W. Butler. Feb. 1999. "Statisical Methods for Semiconductor Manufacturing." Encyclopedia of Electric Engineering, J. G. Webster, Ed.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical-Mechanical Polishing," IEEE Transactions and Components, Packaging, and Manufacturing Technology, Part C, vol. 19, No. 4, pp. 307-314.

Burke, Peter A. Jun. 1991. "Semi-Empirical Modelling of SiO2 Chemcial-Mechanical Polishing Planarization." VMIC Conference, 1991 IEEE, pp. 379-384. IEEE.

Campbell, W. J., S. K. Firth, A. J. Toprac, and T. F. Edgar. May 2002. "A Comparison of Run-to-Run Control Algorithms (Abstract)." Proceedings of 2002 American Control Conference, vol. 3, pp. 2105-2155.

Campbell, W. Jarrett, and Anthony J. Toprac. Feb. 11-12, 1998. "Run-to-Run Control in Microelectronics Manufacturing." Advanced Micro Devises, TWMCC.

Chang, E., B. Stine, T. Maung, R. Divecha, D. Boning, J. Chung, K. Chang, G. Ray, D. Bradbury, O. S. Nakagawa, S. Oh, and D. Bartelink, Dec. 1995. "Using a Statistical Metrology Framework to Identify Systemic and Random Sources of Die-and Wafer-level ILD Thickness Variation in CMP Processes." Washington, D.C.: International Electron Devices Meeting.

Chang, Norman H. and Costas J. Spanos Feb. 1991. "Continuous Equipment Diagnosis Using Evidence Integration: An LPCVD Applicaiton." IEEE Transactions of Semiconductor Manufacturing, v. 4, n. 1, pp. 43-51.

Chemali, Chadi El, James Moyne, Kareemullah Khan, Rock Nadeau, Paul Smith, John Colt, Jonathan Chapple-Sokoi, and Tarun Parikh. Jul./Aug. 2000. "Multizone Uniformity Control of a Chemical Mechanical Polishing Process Utilizing a Pre-and Postmeasurement Strategy." J. Vac. Sci. Technol. A, vol. 18(4). pp. 1287-1296. American Vacuum Society.

Chemali, Chai El, James Moyne, Kareemullah Khan, Rock Nadeau, Paul Smith, John Colt, Jonathan Chapple-Sokol, and Tarum Parikh. Nov. 1998. "Multizone Uniformity Control of a CMP Process Utilizing a Pre and Post-Measurement Strategy." Seattle, Washington: Semetech Symposium.

Chen, Argon and Ruey-Shan Guo. Feb. 2001. "Age-Based Double EWMA Controller and its Application to CMP Processes." IEEE Transactions on Semiconductor Manufacturing, vol. 14, No. 1, pp. 11-19.

Cheung, Robin. Oct. 18, 2000. "Copper Interconnect Technology." AVS/CMP User Group Meeting, Santa Clara, CA.

Consilium Corporate Brochure. Oct. 1999. www.consilium.com

Consilium. 1998. FAB300. Mountain View, California: Consilium, Inc.

Consilium. Aug. 1998. Quality Management Component: and QMC Overview. Mountain View, California: Consilium, Inc.

Consilium. Jan. 1999. "FAB300: Consilium's Next Generation MES Solution of Software and Services which Control and Automate Real-Time FAB Operations." www.consilium.com/products/fab300_page.htm#FAB300 Introduction.

Consilium. Jul. 1999. "Increasing Overall Equipment Effectiveness (OEE) in Fab Manufacturing by Implementing Consilium's Next-Generating Manufacturing Execution System-MES II." Semiconductor Fabtech Edition 10.

Consilium. Nov. 1999. FAB300 Update.

Cunninhgham, James A. 2003. "Using Electrochemistry to Improve Copper Interconnects." http://www.e-insite.net/semiconductor Dec. 1, 2003. Office Action for U.S. Appl. No. 10/173,108, filed Jun. 18, 2002.

Dec. 11, 2003. Office Action for U.S. Appl. No. 09/943,383, filed Aug. 31, 2001.

Dec. 16, 2003. International Search Report for PCT/US03/23964.

Dec. 17, 2002. Office Action for U.S. Appl. No. 09/363,966, filed Jul. 29, 1999.

Dishon, G., D. Eylon, M. Finarov, and A. Shulman. "Dielectric CMP Advanced Process Control Based on Integrated Monitoring." Ltd. Rehoveth, Israel: Nova Measuring Instruments.

Dishon, G., M. Finarov, R. Kipper, J.W. Curry, T. Schraub, D. Trojan, Stambaugh, Y. Li and J. California: VMIC Speciality Conferences, International CMP Planarization Conference.

Durham, Jim and Myriam Roussel. 1997. "A Statistical Method for Correlating In-Line Defectivity to Probe Yield." IEEE/SEMI Advanced Semiconductor Manufacturing Conference, pp. 76-77.

Edgar, T. F., W. J. Campbell and C. Bode. Dec. 1999. "Model-Based Control in Microelectronics Manufacturing." Proceedings of the 38th IEEE Conference on Decision and Control, Pheonix, Arizona, vol. 4, pp. 4185-4191.

May 1998. "Automatic Control in Microelectronics Manufacturing: Practices, Challenges, and Possibilities." Automatica, vol. 36, pp. 1567-1603, 2000.

Edgar, Thomas F., Stephanie W. Butler, Jarrett Campbell, Carlos Pfieffer, Chris Bode, Sung Bo Hwang, and K.S. Balakrishnan, and J. Hahn. Nov. 2000. "Automatic Control in Microelectronics Manufacturing: Practices, Challenges, and Possibilities (Abstract)." Automatica, v. 36, n. 11.

Eisenbraun, Eric, Oscar van der Straten, Yu Zhu, Katharine Dovidenko, and Alain Kaloyeros. 2001. "Atomic Layer Depostion (ALD) of Tantalum-Based Materials for Zero Thickness Copper Barrier Applications" (Abstract). IEEE pp. 207-209.

Elers, Kai-Erki, Ville Saanila, Pekka J. Soininen, Wei-Min Li, Juhana T. Kostamo, Suvi Haukka, Jyrki Juhanoja, and Wim F.A. Besling. 2002. "Diffusion Barrier Depostion on a Copper Surface by Atomic Layer Deposition" (Abstract). Advanced Materials vol. 14, No. 13-14, pp. 149-153.

Fan, Jr-Min, Ruey-Shan Guo, Shi-Chung Chang, and Kian-Huei Lee. 1996. "Abnormal Trend Detection of Sequence-Disordered Data Using EWMA Method." IEEE/SEMI Advanced Semiconductor Manufacturing Conference, pp. 169-174.

Fang, S. J., A. Barda, T. Janecko, W. Little, D. Outley, G. Hempel, S. Joshi, B. Morrison, G. B. Shinn, and M. Birange. 1998. "Control of Dielectric Chemical Mechanical Polishing (CMP) Using and Interferometry Based Endpoint Sensor." International Proceedings of the IEEE Interconnect Technology Conference, pp. 76-78.

Feb. 10, 2003. Office Action for U.S. Appl. No. 09/619,044, filed Jul. 19, 2000.

Feb. 1984, "Method and Apparatus of in Situ Measurement and Overlay Error Analysis for Correcting Step and Repeat Lithographic Cameras." IBM Technical Disclosure Bulletin, pp. 4855-4859.

Feb. 1984. "Substrate Screening Process." IBM Technical Disclosure Bulletin, pp. 4824-4825.

Feb. 1993. "Electroless Plating Scheme to Hermetically Seal Copper Features." IBM Technical Disclosure.Bulletin. pp. 405-406.

Feb. 2, 2004. Office Action for U.S. Appl. No. 09/363,966, filed Jul. 29, 1999.

Good, Richard and S. Joe Qin. May 2002. "Stability Analysis of Double EWMA Run-to-Run Control with Metrology Delay." IEEE/CPMT International Electronics Manufacturing Technology Symposium, pp. 355-363.

Guo, R.S., A. Chen, C.L. Tseng, I.K. Fong, A. Yang, C.L. Lee, C.H. Wu, S. Lin, S.J. Huang, Y.C. Lee, S.G. Chang, and M.Y. Lee., Jun. 16-17. 1998. "A Real-Time Equipment Monitoring and Fault Detection System." Semiconductor Manufacturing Technology Workshop, pp. 111-121.

Herrmann, D. 1988. "Temperature Errors and Ways of Elimination for Contactless Measurement of Shaft Vibrations (Abstract)." Technisches, vol. 55 No. 1, pp. 27-30. West Germany.

Heuberger, U. Sep. 2001. "Coating Thickness Measurement with Dual-Function Eddy-Current & Magnetic Inductance Instrument (Abstract)." Galvanotechnik, vol. 92, No. 9, pp. 2354-2366.

Hu, Albert, He Du, Steve Wong, Peter Rentein, and Emmanual Sachs. 1994. "Application of Run by Run Controller to the Chemcial-Mechanical Planarization Process." IEEE/CPMT International Electronics Manufacturing Technology Symposium, pp. 371-378.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126-132.

Islam Raja, M. M., C. Chang, J. P. McVittie, M. A. Cappelli, and K. C. Saraswat. May/Jun. 1993. "Two Precursor Model for Low-Pressure Chemical Vapor Deposition of Silicon Dioxide from Tetraethlorthosilicate." J. Vac. Sci. Technol. B, vol. 11, No. 3, pp. 720-726.

Itabashi, Takeyuki, Hiroshi Nakano, and Haruo Akahoshi. Jun. 2002. "Electroless Deposited CoWB for Copper Diffusion Barrier Metal." IEEE International Interconnect Technology Conference, pp. 285-287.

Jan. 20, 2004. Office Action for U.S. Appl. No. 08/927,444, filed Aug. 13, 2001.

Jan. 23, 2004. International Search Report for PCT/US02/24860.

Jensen, Alan, Peter Rentein, Stephen Jew, Chris Raeder, and Patrick Cheung. Jun. 2001. "Empirical-Based Modeling for Control of CMP Removal Uniformity." Solid State Technology, vol. 44, No. 6, pp. 101-102, 104, 106. Cowan Publ. Corp.: Washington, D.C.

Johnson, Bob. Jun. 10, 2002. "Advanced Process Control Key to Moore's Law." Gartner, Inc.

Jul. 12, 2004. Office Action for U.S. Appl. No 10/173,108, filed Jun. 8, 2002.

Jul. 15, 2004. Office Action for U.S. Appl. No. 10/172,977, filed Jun. 18,2002.

Jul. 1998. "Active Controller: Utilizing Active Databases for Implementing Multishop Control of Semiconductor Manufacturing (Abstract)." IEEE Transactions on Components, Packaging and Manufacturing Technology—Part C, vol. 21, No. 3, pp. 217-224.

Jul. 23, 2002. Communication Pursuant to Article 96(2) EPC for Eurpean Patent Application No. 00 115 577.9.

Jul. 23, 2003. Invitation to Pay Additional Fees and Communication Relating to the Results of the Partical International Search for PCT/US02/19116.

Jul. 25, 2003. International Search Report for PCT/US02/24858.

Jul. 29, 2002. International Search Report for PCT/US01/27407.

Jul. 5, 2001. "Motorola and Advanced Micro Devices Buy ObjectSpace Catalyst Advanced Process Control Product for Five Wafer Fabs." www. semiconductorfabtech.com/industry.news/9907/20.07.shtml.

Jul. 9, 2002, International Search Report for PCT/US0124910.

Jun. 18. 2003. Office Action for U.S. Appl. No. 09/655/542, filed Sep. 6, 2000.

Jun. 20, 2002, Office Action for U.S. Appl. No. 09/619,044, filed Jul. 19, 2000.

Jun. 23, 2004. Office Action for U.S. Appl. No. 10/686,589, filed Oct. 17, 2003.

Jun. 3, 2004. Office Action for U.S. Appl. No. 09/928,474, filed Aug. 14, 2001.

Jun. 30, 2004. Office Action for U.S. Appl. No. 09/800,980, filed Mar. 8, 2001.

Khan, K., C. El Chemali, J. Moyne, J. Chapple-Sokol, R. Nadeau, P. Smith, C., and T. Parikh. Oct. 1999. "Yield Improvement at the Contact Process Through Run-to-Run Control (Abstract)." 24th IEEE/CPMT Electronics Manufacturing Technology Symposium, pp. 258-263.

Khan, Kareemullah, Victor Solakhain, Anthony Ricci, Tier Gu, and James Moyne. 1998. "Run-to-Run Control of ITO Deposition Process." Ann Arbor, Michigan.

Khan, S., M. Musavi, and H. Ressom. Nov. 2000. "Critical Dimension Control in Semiconductor Manufacturing (Abstract)." Annie 2000. Smart Engineering Systems Design Conference, pp. 995-1000, St. Louis, Missouri Kim Eui Jung and William N. Gill. Jul. 1994, "Analytical Model for Chemical Vapor Depositon of Si02 Films Using Tetraethoxysliane and Ozone" (Abstract). Journal or Crystal Growth, vol. 140, Issues 3-4, pp. 315-326.

Kim, Y.T. and H. Sim. 2002. "Characteristics of Pulse Plasma Enhanced Atomic Layer Deposition of Tungsten Nitride Diffusion Barrier for Copper Interconnect" (Abstract). IEIC Technical Report. vol. 102, No. 178, pp. 115-118.

KLA-Tencor Corporation. 2002. "KLA Tencor: Press Release: KLA-Tencor Introduces First Production-Worthy Copper CMP In-Situ Film Thickness and End-point Control System: Multi-Million Dollar Order Shiiped to Major CMP Tool Manufacturing." www.kia-tencor.com/news_events/press_releases_/press_releases2001/984086002.htlm.

Klein, Bruce. Jun. 1999. "Application Development: XML Makes Objects Models More Useful." Informationweek. pp. 1A-6A.

Kurtzberg, Jermone M. and Menachem Levanoni. Jan. 1994. "ABC: A Better Control for Manufacturing." IBM Journal of Research and Development, v. 38, n. 1, pp. 11-30.

Lanz, Mikkel. 1999. "Equipment and APC Integration at AMD with Workstream," IEEE, pp. 325-327.

Larrabee, G. B. May 1991. "The Intelligent Microelectronics Factory of the Future (Abstract)." IEEE/SEMI International Semiconductor Manufacturing Science Symposium, pp. 30-34. Burlingame, CA.

Leang, Sovarong, Shang-Yi Ma, John Thomson, Bart John Bombay, and Costas J. Spanos. May 1996. "A Control System for Photolighographic Sequences," IEEE Transactions on Semiconductor Manufacturing, vol. 9, No. 2.

Lee, Brain, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

Levine, Martin D. 1985. Vision in Man and Machine. New York: McGraw-Hill, Inc. pp. ix-xii, 1-58.

Lin, Kuang-Kuo and Costas J. Spanos, Nov. 1990. "Statistical Equipment Modeling for VLSI Manufacturing: An Applicaiton for LPCVD." IEEE Transactions on Semiconductor Manufacturing, v. 3, n. 4, pp. 216-229.

Mar.15, 2002. Office Action for U.S. Appl. No. 08/469,227, filed Dec. 22, 1999.

Mar. 25, 2003. International Search Report for PCT/US02/24859.

Mar. 29, 2002. Office Action for U.S. Appl. No. 09/363/966, filed Jul. 29, 1999.

Mar. 30, 2004. Written Opinion for PCT/US02/19062.

Mar. 5, 2001. "KLA-Tencor Introduces First Production-worthy Copper CMP In-situ Film Thickness and End-point Control System." http://www.kla-tencor.com.

Matsuyama, Akira and Jessi Niou. 1993. "A State-of-the-Art Automation System of an ASIC Wafer Fab in Japan." IEEE/SEMI International Semiconductor Manufacturing Science Symposium, pp. 42-47.

May 1992, "Lawer Ablation Endpoint Detector." IBM Technical Disclosure Bulletin, pp. 333-334.

May 23, 2003. Written Opinion for PCT/US01/24910.

May 28, 2004. Office Action for U.S. Appl. No. 09/943,383, filed Aug. 31, 2001.

May 5, 2004. International Preliminary Examination Report for PCT/US01/27406.

May 5, 2004. Office Action for U.S. Appl. No. 09/943,955, filed Aug. 31, 2001.

May 8, 2003. Office Action for U.S. Appl. No 09/637,620, filed Aug. 11, 2000.

McInthosh, John. Mar. 1999, "Using CD-SEM Metroology in the Manufacture of Semiconductors (Abstract)." JOM, vol. 51, No. 3, pp. 38-39.

Meckl, P. H. and K. Umemoto. Apr. 2000. "Achieving Fast Motions by Using Shaped Reference Inputs <Semiconductor Manufacturing Maching> (Abstract)." NEC Research and Development, vol. 41, No. 2, pp. 232-237.

Meckl, P. H. and K. Umemoto. Aug. 1999, "Achieving Fast Motions in Semiconductor Manufacturing Machinery (Abstract)." Proceedings of the 1999 IEEE International Conference on Control Applications, vol. 1, pp. 725-729, Kohala Coast, HI.

Miller, G. L., D. A. H. Robinson, and J. D. Wiley. Jul. 1976, "Contactless measurement of semiconductor conductivity by radio frequencey-free-carrier power absorption." Rev. Sci. Instrum., vol. 47, No. 7. pp. 799-805.

Moyne, J., V. Solakhian, A. Yershov, M. Anderson, and D. Mockler-Herbert. Apr.-May 2002. "Development and Deployment of a Multi-Component Advanced Process Control System for an Epitaxy Tool (Abstract)." 2002 IEEE Advanced Semiconductor Manufacturing Conference and Workshop, pp. 125-130.

Moyne, James R., Nauman Chaudhry, and Roland Telfeyan. 1995. "Adaptive Extensions to a Multi-Branch Run-to-Run Controller for Plasma Etching." Journal of Vaccum Science and Technology. Ann Arbor, Michigan: University of Michigan Display Technology Manufacturing Center.

Moyne, James, and John Curry. Jun. 1998. "A Fully Automated Chemical-Mechanical Planarization Process." Santa Clara, California: VLSI Multilevel Interconnection (V-MIC) Conference.

Moyne, James, Roland Telfeyan, Arnon Hurwitz, and John Taylor. Aug. 1995. "A Process-Independent Run-to-Run Controller and Its Application to Chemical-Mechanical Planarization." SEMI/IEEE Advanced Semiconductor Manufacturing Conference and Workshop. Ann Arbor, Michigan: The University of Michigan, Electrical Engineering & Computer Science Center for Display Technology & Manufacturing.

Moyne, James. Oct. 1999. "Advancements in CMP Process Automation and Control." Hawaii: (Invited paper and presentation to) Third International Symposium on Chemical Mechanical Polishing in IC Device Manufacturing: 196th Meeting of the Electrochemical Society.

Mozumder, Purnendu K. and Gabriel G. Barna. Feb. 1994. "Statistical Feedback Control of a Plasma Etch Process," IEEE Transaction on Semiconductor Manufacturing, v. 7, n. 1, pp. 1-11.

Muller-Heinzerling, Thomas, Ulrich Neu, Hans Georg Nurnberg, and Wolfgang May. Mar. 1994. "Recipe-Controlled Operation of Batch Processes with Batch X." ATP Automatisierungstechnische Praxis, vol. 36, No. 3, pp. 43-51.

Mullins, J. A., W. J. Campbell, and A. D. Stock. Oct. 1997. "An Evaluation of Model Predictive Control in Run-to-Run Processing in Semiconductor Manufacturing (Abstract)." Proceedings of the SPIE;The International Society for Optical Engineering Conference, vol. 3213, pp. 182-189.

"NanoMapper FA factory automation wafer nanotopography measurement." Printed Dec. 9, 2003. http://www.phase-shift.com/nanomapperfa.shtml.

"NanoMapper wafer nanotopography measurement by ADE Phase Shift." Printed Dec. 9. 2003. http://www.phase-shift.com/nanomap.shtml.

Nov. 11, 2002. International Search Report for PCT/US02/19117.

Nov. 12, 2002. International Search Report for PCT/US02/19063.

Nov. 17,2004. Written Opinion for PCT Appl. No. PCT/US01/27407.

Nov. 1999. "How to Use EWMA to Achieve SPC and EPC Control," International Symposium on NDT Contribution to the Infrastructure Safety Systems, Tores, Brazil. http://www.ndt.net/abstract/ndtiss99/data/35.

Nov. 5, 2003. Office Action for U.S. Appl. No. 10/172,977, filed Jun. 18, 2002.

Nov. 7, 2002. International Search Report for PCT/US02/19061.

NovaScan 2020. Feb. 2002. "Superior Integrated Process Control for Emerging CMP High-End Applications."

Oct. 1, 2004. International Preliminary Examination Report for PCT Appl. No. PCT/US03/23964.

Oct. 12, 2004. International Preliminary Examination Report for PCT Appl. No. PCT/US02/19061.

Oct. 14, 2003. PCT International Search Report from PCT/US02/21942.

Oct. 15, 2001. Search Report prepared by the Austrian Patent Office for Singapore Patent Application No. 200004286-1.

Oct. 15, 2002. International Search Report for PCT/US02/19062.

Oct. 1984. "Method to Characterized the Stability of a Step and Repeat Lighographic System." IBM Technical Disclosure Bulletin, pp. 2857-2860.

Oct. 20, 2003. PCT International Search Report from PCT/US02/19116.

Oct. 23, 2002. International Search Report for PCT/US01/27406.

Oct. 23, 2002. Office Action for U.S. Appl. 09/469,227, filed Dec. 22, 1999.

Oct. 23, 2003. PCT International Preliminary Examination Report from PCT/US01/24910.

Oct. 4, 2002. International Search Report for PCT/US01/22833.

Oct. 6, 2004. Office Action for U.S. Appl. No. 10/759108, filed Jan. 20, 2004.

Oechsner, R., T. Tschaftary, S. Sommer, L. Pfitzner, H. Ryssel, H. Gerath, C. Baier, and M. Hafner. Sep. 2000. "Feed-forward Control for a Lithography/Etch Sequence (Abstract)," Proceedings of the SPIE—The International Society for Optical Engineering Conference, vol. 4182, pp. 31-39.

Ostain, Yu. Ya. Oct. 1981. "Optimization of Thickness Inspection of Electrically Conductive Single-Layer Coatings with Laid-on Eddy-Curretn Transducers (Abstract)." Defektoskopiya, vol. 17, No. 10, pp. 45-52. Moscow, USSR.

Ouma, Dennis, Duane Boning, James Chung, Greg Shinn, Leif Olsen, and John Clark . 1998. "An Integrated Characterization and Modeling Methodology for CMP Dielectric Planaization." Proceedings of the IEEE 1998 International Interconnect Technology Conference, pp. 67-69.

Pan, J. Tony, Ping Li, Kapila Wijekoon, Stan Tsai, and Fritz Redeker. May 1999. "Copper CMP Integration and time Dependent Pattern Effect." IEEE 1999 International Interconnect Technology Conference, pp. 164-166.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." IEEE pp. 603-606.

Pilu, Maurizio. Sep. 2001. "Undoing Page Curl Distortion Using Applicable Surfaces," IEEE International Conference on Image Processing. Thessalonica, Greece.

Rampalli, Prasad, Arakere Ramesh, and Nimish Shah. 1991. CEPT-A Computer-Aided Manufacturing Application for Managing Equipment Reliability and Availability in the Semiconductor Industry. New York, New York: IEEE.

Ravid, Avi, Avner Sharon, Amit Weingarten, Vladmir Machavariani, and David Scheiner, 2000. "Copper CMP Planarity Control Using ITM." IEEE/SEMI Advanced Semiconductor Manufacturng Conference, pp. 437-443.

Reitman, E. A., D. J. Friedman, and E. R. Lory. Nov. 1997. "Pre-Production Results Demonstration Multiple-System Models for Yield Analysis (Abstract)." IEEE Transactions on Semiconductor Manufacturing, vol. 10, No. 4, pp. 469-481.

Rocha, Joao and Carlow Ramos. Sep. 12, 1994. "Task Planning for Flexible and Agile Manufacturing Systems." Intelligent Robots and Systems '94. Advanced Robotic Systems and the Real World, IROS '94. Proceedings of the IEEE/RSJ/GI International Conference on Munich, Germany Sep. 12-16, 1994. New York, New York: IEEE. pp. 105-112.

Ruegsegger, Steven, Aaron Wagner, James S. Freudenberg, and Dennis S. Grimard. Nov. 1999. "Feedforward Control for Reduced Run-to-Run Variation in Microelectronics Manufacturing," IEEE Transactions on Semiconductor Manufacturing, vol. 12, No. 4.

Runyan, W. R., and K. E. Bean. 1990. "Semiconductor Integrated Circuit Processing Technology." p. 48. Reading, Massachusetts: Addison-Wesley Publishing Company.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh, Apr. - May 2002. "Advanced Process Control Solutions for Semiconductor Manufacturing." Boston, Massachusetts: 13th Annual IEEE/SEMI Advanced Semiconductor Manufacturing Conference. Advancing the Science and Technology of Semiconductor Manufacturing. ASMC 2002, pp. 101-106.

Scarr, J. M. and J. K. Zelisse. Apr. 1993. "New Topoology for Thickness Monitoring Eddy. Current Sensors (Abstract)." Proceedings of the 36th Annual Technical Conference, Dallas, Texas.

Schaper, C. D., M. M. Moslehi, K. C. Saraswat, and T. Kailath. Nov. 1994. "Modeling, Identifcation, and Control of Rapid Thermal Processing Systems (Abstract)." Journal of the Electrochemcial Society, vol. 141, No. 11, pp. 3200-3209.

Schmid, Hans Albrecht. 1995. "Creating the Architecture of a Manufacturing Framework by Design Patterns," Austin, Texas: OOPSLA.

SEMI. 2000. "Provisional Specification for CIM Framework Scheduling Components." San Jose, California. SEMI E105-1000.

SEMI. <1986> 1996. "Standard for Definition and Measurement of Equipment Reliability, Availability, and Mantainability (RAM)." SEMI E10-96.

SEMI. Jul. 1998. New Standard: Provisional Specification for CIM Framework Domain Architecture. Mountain View, California: SEMI Standards. SEMI Draft Doc. 2817.

"Semiconductor Manufacturing: An Overview" http://users.ece.gatech.edu/2dc;gmay/overview.html.

Sep. 15, 2003. Office Action for U.S. Appl. No. 09/928,474, filed Aug. 14, 2001.

Sep. 15, 2003. Office Action for U.S. Appl. No. 10/632,107, filed Aug. 1, 2003.

Sep. 16, 2004. International Preliminary Examination Report for PCT Appl. No PCT/US02/24859.

Sep. 26, 2002. Office Action for U.S. Appl. No. 09/637,620, filed Aug. 11, 2000.

Sep. 29, 2004. Office Action for U.S. Appl. No. 09/363,966, filed Jul. 29, 1999.

Sep. 9, 2004. Written Opinion for PCT Appl. No. PCT/US02/21942.

Shindo, Wataru, Eric H. Wang, Ram Akella, and Andrzej J. Srojwas. 1997. "Excursion Detection and Source Isolation in Defect Inspection and Classification." 2nd International Workshop on Statistical Metrology, pp. 90-93.

Smith, S.R., K.E. Elers, T. Jacobs, V. Blaschke, and K. Pfeifer. 2001. "Physical and Electrical Characterization of ALD Tin Used as a Copper Diffusion Barrier in .025 mum, Dual Damascene Backened Structures" (Abstract). Advanced Metallization Conference 2001. Montreal, Quebec.

Smith, Stewart, Anthony J. Walton, Alan W. S. Ross, Georg K. H. Bodammer, and J. T. M. Stevenson. May 2000. "Evaluation of Sheet Resistance and Electrical Linewidth Measurement Techniques for Copper Damascene Interconnect." IEEE Transactions on Semiconductor Manufacturing, vol. 15, No. 2, pp. 214-222.

Smith, Taber and Duane Boning. 1996. "A Self-Tuning EWMA Controller Utilizing Artificial Neural Network Function Approximation Techniques," IEEE/CPMT International Electronics Manufacturing Technology Symposium, pp. 355-363.

Smith, Taber and Duane Bonig, James Moyne, Arnon Hurwitz, and John Curry. Jun. 1996. "Compensating for CMP Pad Wear Using Run by Run Feedback, Control." Santa Clara, California: Proceedings of the Thirteenth International VLSI Multilevel Interconnection Conference. pp. 437-439.

Sonderman, Thomas. 2002. "APC as a Competitive Manufacturing Technology: AMD's Vision for 300nm." AEC/APC.

Spanos, C. J., S. Leang, S.-Y. Ma, J. Thomson, B. Bombay, and X. Niu. May 1995. "A Multistep Supervisory Controller for Photolithographic Operations (Abstract)." Proceedings of the Symposium on Process Control, Diagnostics, and Modeling in Semiconductor Manufacturing, pp. 3-17.

Spanos, Costas J., Hai-Fang Guo, Alan Miller, and Joanne Levine-Parrill. Nov. 1992. "Real-Time Statistical Process Control Using Tool Data." IEEE Transaction on Semiconductor Manufacturing, v. 5, n. 4, pp. 308-318.

Stoddard, K. P. Crouch, M. Kozicki, and K. Taskalis, Jun.-Jul. 1994. "Application of Feedforward and Adaptive Feedback Control to Semiconductor Device Manufacturing (Abstract)." Proceedings of 1994 American Control Conference—ACC '94, vol. 1, pp. 892-896. Baltimore Maryland.

Sun, S.C. 1998. "CVD and PVD Transition Metal Nitrides as Diffusion Barriers for Cu Metallization." IEEE pp. 243-246.

Suzuki, Junichi and Yoshikazu Yamaoto. 1998. "Toward the Interoperable Software Design Models: Quartet of UML, XML, DOM and CORBA." Proceedings IEEE International Software Engineering Standards Symposium. pp. 1-10.

Tagami, M., A. Furuya, T. Onodera, and Y. Hayashi. 1999. "Layered Ta-nitrides (LTN) Barrier Film by Power Swing Sputtering (PSS) Technique for MOCVD-Cu Damascene Interconnects." IEEE pp. 635-638.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous-Low-k/Copper Integration by Using Electro-Chemical Polishing." 2002 Symposium on VLSI Technology Digest of Technical Papers, pp. 32-33.

Tan, K. K., H. F. Dou, and K. Z. Tang. May-Jun. 2001. "Precision Motion Control System for Ultra-Precision Semiconductor and Electronic Components Manufacturing (Abstract)." 51st Electronic Components and Technology Conference 2001. Proceedings, pp. 1372-1379 Orlando, Florida.

Tao, K. M., R. L. Kosut, M. Ekblad, and G. Aral, Dec. 1994. "Feedfoward Learning Applied to RTP of Semiconductor Wafers (Abstract)." Proceedings of the 33rd IEEE Conference on Decision and Control, vol. 1 pp. 67-72. Lake Buena Vista, Florida.

Telfeyan, Roland, James Moyne, Nauman Chaudhry, James Pugmire, Scott Shellman, Duane Boning, William Moyne, Arnon Hurwitz, and John Taylor. Oct. 1995. "A Multi-Level Approach to the Control of a Chemcial-Mechanical Planarization Process." Minneapolis, Minnesota: 42nd National Symposium of the American Vaccum Society.

Tobin, K. W., T. P. Karnowski, L. F. Arrowood, and F. Lakhani. Apr. 2001. "Field Test Results of an Automated Image Retrieval System (Abstract)." Advanced Semiconductor Manufacturing Conference, 2001 IEEE/SEMI, Munich, Germany.

U.S. Appl. No. 09/363,966 filed Jul. 29, 1999, Arackaparambil et al. Computer Integrated Manufacturing Techniques.

U.S. Appl. No. 09/469,227 filed Dec. 22, 1999, Somekh et al. Multi-Tool Control System, Method and Medium.

U.S. Appl. No. 09/619,044 filed Jul. 19, 2000, Yuan System and Method of Exporting or Importing Object Data in a Manufacturing Execution System.

U.S. Appl. No. 09/637,620 filed Aug. 11, 2000, Chi et al. Generic Interface Builder.

U.S. Appl. No. 09/655,542 filed Sep. 6, 2000, Yuan System, Method and Medium for Defining Palettes to Transform an Application Program Interface for a Service.

U.S. Appl. No. 09/656,031 filed Sep. 6, 2000, Chi et al. Dispatching Component for Associating Manufacturing Facility Service Requestors with Service Providers.

U.S. Appl. No. 09/725,908 filed Nov. 30, 2000, Chi et al. Dynamic Subject Information Generation in Message Services of Distributed Object Systems.

U.S. Appl. No. 09/800,980 filed Mar. 8, 2001, Hawkins et al. Dynamic and Extensible Task Guide.

U.S. Appl. No. 09/811,667 filed Mar. 20, 2001, Yuan et al. Fault Tolerant and Automated Computer Software Workflow.

U.S. Appl. No. 09/927,444 filed Aug. 13, 2001 Ward et al. Dynamic Control of Wafer Processing Paths in Semiconductor Manufacturing Processes.

U.S. Appl. No. 09/928,473 filed Aug. 14, 2001 Koh Tool Services Layer for Providing Tool Service Functions in Conjunction with Tool Functions.

U.S. Appl. No. 09/928,474 filed Aug. 14, 2001 Krishnamurthy et al. Experiment Management System, Method and Medium.

U.S. Appl. No. 09/943,383 filed Aug. 31, 2001 Shanmugasundram et al. In Situ Sensor Based Control of Semiconductor Processing Procedure.

U.S. Appl. No. 09/943,955 filed Aug. 31, 2001 Shanmugasundram et al. Feedbacl Control of a Chemical Mechanical Polishing Device Providing Manipulation of Removal Rate Profiles.

U.S. Appl. No. 09/998,372 filed Nov. 30, 2001 Paik Control of Chemical Mechanical Polishing Pad Conditioner Directional Velocity to Improve Pad Life.

U.S. Appl. No. 09/998,384 filed Nov. 30, 2001 Paik Feedforward and Feedback Control for Conditioning of Chemical Mechanical Polishing Pad.

U.S. Appl. No. 10/084,092 filed Feb. 28, 2002, Arackaparamil et al. Computer Intergrated Manufacturing Techniques.

U.S. Appl. No. 10/100,184 filed Mar. 19, 2002, Al-Bayati et al. Method, System and Medium for Controlling Semiconductor Wafer Processing Using Critical Dimension Measurements.

U.S. Appl. No. 10/135,405 filed May 1, 2002, Reiss et al. Integration of Fault Detection with Run-to-Run Control.

U.S. Appl. No. 10/135,451 filed May 1, 2002, Shanmugasundram et al. Dynamic Metrology Schemes and Sampling Schemes for Advanced Process Control in Semiconductor Processing.

U.S. Appl. No. 10/172,977 filed Jun. 18, 2002, Shanmugasundram et al. Method, System and Medium for Process Control for the Matching of Tools, Chambers and /or Other Semiconductor-Related Entities.

U.S. Appl. No. 10/173,108 filed Jun. 18, 2002, Shanmugasundram et al. Integrating Tool, Module, and Fab Level Control.

U.S. Appl. No. 10/174,370 filed Jun. 18, 2002, Shanmugasundram et al. Feedback Control of Plasma-Enhanced Chemical Vapor Deposition Processes.

U.S. Appl. No. 10/174,377 filed Jun. 18, 2002, Schwarm et al. Feedback Control of Sub-Atmospheric Chemcial Vapor Deposition Processes.

U.S. Appl. No. 10/377,654 filed Mar. 4, 2003, Kokotov et al. Method, System and Medium for Controlling Manufacturing Process Using Adaptive Models Based on Empirical Data.

U.S. Appl. No. 10/393,531 filed Mar. 21, 2003, Shanmugasundram et al. Copper Wiring Module Control.

U.S. Appl. No. 10/632,107 filed Aug. 1, 2003, Schwarm et al. Method, System, and Medium for Handling Misrepresentative Metrology Data Within an Advanced Process Control System.

U.S. Appl. No. 10/665,165 filed Sep. 18, 2003, Paik Feedback Control of a Chemical Mechanical Polishing Process for Multi-Layered Films.

U.S. Appl. No. 10/712,273 filed Nov. 14, 2003, Kokotov Method, System and Medium for Cotrolling Manufacture Process Having Multivariate Parameters.

U.S. Appl. No. 10/759,108 filed Jan. 20, 2004, Schwarm Automated Design and Execution of Experiments with Integrated Model Creation for Semiconductor Manufacturing Tools.

U.S. Appl. No. 10/765,921 filed Jan. 29, 2004, Schwarm System, Method, and Medium for Monitoring Performance of an Advanced Process Control System.

U.S. Appl. No. 10/809,906 filed Mar. 26, 2004, Surana et al. A Technique for Process-Qualifying a Semiconductor Manufacturing Tool Using Metrology Data.

U.S. Appl. No. 10/809,908 filed, Mar. 26, 2004, Yang et al. Improved Control of Metal Resistance in Semiconductor Products via Integrated Metrology.

U.S. Appl. No. 10/812,480 filed Mar. 30, 2004, Padhi et al. Selective Metal Encapsulation Schemes.

U.S. Appl. No. 10/856,016 filed May 28, 2004, Paik Improved Process Control by Distinguishing a White Noise Component of a Process Variance.

U.S. Appl. No. 10/855,711 filed May 28, 2004, Paik Dynamic Offset and Feedback Threshold.

Van der Straten, O., Y. Shu, E. Eisenbraun, and A. Kaloyeros. 2002. "Thermal and Electrical Barrier Performance Testing of Ultrathin Atomic Layer Deposition Tantalum-Based Materials for Nanoscale Copper Metallization." IEEE pp. 188-190.

Van Zant, Peter. 1997. Microchip Fabrication: A Practical Guide to Semiconductor Processing. Third Edition, pp. 472-478. New York, New York: McGraw-Hill.

"Wafer flatness measurement of advanced wafers." Printed Dec. 9, 2003. http://www.phase-shift.com/wafer-flatness.shtml.

Wang, LiRen and Hefin Rowlands. 2001. "A Novel NN-Fuzzy-SPC Feedback Control System." 8th IEEE International Conference on Emerging Technologies and Factory Automation, pp. 417-423.

Williams, Randy, Dadi Gudmundsson, Kevin Monahan, Raman Nurani, Meryl Stroller and J. George Shanthikumar. Oct. 1999. "Optimized Sample Planning for Wafer Defect Inspection." Semiconductor Manufacturing Conference Proceedings, 1999 IEEE International Symposium on Santa Clara, CA. Piscataway, NJ. pp. 43-46.

Wu, Z.C., Y.C. Lu, C.C. Chiang, M.C. Chen, B.T. Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65-nm BEOL Technology." IEEE pp. 595-598.

Yamagishi, H., Z. Tokei, G.P. Beyer, R. Donation, H. Bender, T. Nogami, and K. Maex. 2000. "TEM/SEM Investigation and Electrical Evaluation of a Bottomless I-PVD TA(N) Barrier in Dual Damascene" (Abstract). Advanced Metallization Conference 2000, San Diego, CA.

Yasuda, M., T. Osaka, and M. Ikeda. Dec. 1996. "Feedfoward Control of a Vibration Isolation System for Disturbance Suppression (Abstract)." Proceeding of the 35th IEEE Conference on Decision and Control, vol. 2, pp. 1229-1233. Kobe, Japan.

Yeh, C. Eugene, John C. Cheng, and Kwan Wong. 1993. "Implementation Challenges of a Feedback Control System for Wafer Fabrication." IEEE/CHMT International Electronics Manufacturing Technology Symposium, pp. 438-442.

Zhe, Nign, J. R. Moyne, T. Smith, D. Boning, E. Del Castillo, Yeh Jinn-Yi, and Hurwitz. Nov. 1996. "A Comparative Analysis of Run-to-Run Control Algorithms in Semiconductor Manufacturing Industry (Abstract)." IEEE/SEMI 1996 Advanced Semiconductor Manufacturing Conference Workshop, pp. 375-381.

Zhou, Zhen-Hong and Rafael Reif. Aug. 1995. "Epi-Film Thickness Measurements Using Emission Fourier Transform Infrared Spectroscopy—Part II: Real-Time in Situ Process Monitoring and Control." IEEE Transactions on Semiconductor Manufacturing, vol. 8, No. 3.

Zorich, Robert, 1991. Handbook of Quality Integrated Circuit Manufacturing. pp. 464-498 San Diego, California: Academic Press, Inc.

Nov. 30, 2005. Notice of Allowance for U.S. Appl. No. 10/856,016.

Dec. 7, 2004 Notice of Allowance for U.S. Appl. No. 10/855,711.

US 6,150,664, 11/2000, Su (withdrawn)

* cited by examiner

PROCESS CONTROL BY DISTINGUISHING A WHITE NOISE COMPONENT OF A PROCESS VARIANCE

CROSS-REFERENCE TO RELATED APPLICATIONS

This application is a continuation of published U.S. patent application Ser. No. 10/856,016 filed on May 28, 2004 now U.S. Pat. No. 7,096,085. This application is related to U.S. Pat. No. 6,961,626 entitled "Dynamic Offset and Feedback Threshold," filed on May 28, 2004.

BACKGROUND OF THE INVENTION

1. Field of the Invention

The present invention concerns computer-implemented and/or computer-enabled methods, systems, and mediums for enabling improved control of errors during process control. More specifically, one or more embodiments of the present invention relate to distinguishing a variance due to white noise from a statistical process variance measured during process control, particularly in connection with semiconductor manufacturing.

2. Description of the Related Art

Detecting and controlling errors during a manufacturing process is an important goal. This is particularly true in connection with the process of manufacturing semiconductors. During the manufacturing process, various measurements are made in order to detect and/or determine errors, e.g., to detect when an observed value differs significantly from an intended target result. When the difference is sufficient, the manufacturing process control system will attempt to control (e.g., compensate for) the error so as to continue to produce products (e.g., chips) that are within acceptable ranges or tolerances from the target result.

In general, it has been observed that semiconductor devices processed in connection with a semiconductor manufacturing process will inevitably include at least some error or some deviation from the intended target result or specification. In order to determine when it is desired to perform additional control in order to make an adjustment during processing, conventional systems utilize a threshold value as a trigger. Whenever the additional control is triggered and the adjustment is made, however, the result following the adjustment still will usually deviate from the intended target result. Further, there are tolerances within which a tighter adjustment of a control does not effectively cause the material to be processed closer to specification, since the control is simply not capable of a sufficiently fine adjustment.

Conventionally, control of an error is attempted when one or more preconditions assigned to a tolerance range for the target specification, are evaluated using a statistical approach and are satisfied. The conventional statistical approach employs a standard deviation. Nevertheless, even when the process control system uses standard deviation as the threshold value, there is always a lack of precision, or a tolerance range within which it is not truly possible to control more tightly.

A significant reason often preventing tolerance ranges from being controlled more tightly is that some portion of the measurement, including the amount of observed value which is determined to be error, may actually be due to "white noise". White noise does not necessarily represent an "error". White noise represents an uncontrollable (and typically temporary) fluctuation in measurement. One example of white noise in a semiconductor manufacturing system is a sudden and temporary disturbance in ambient temperature, which is neither measured nor controlled, but would result in a change in thickness of the product. When determining whether an error occurred and/or how much (and whether) to compensate for any difference from the desired target result and/or to control an error that may occur during the manufacturing process, white noise should be taken into account.

The true amount of white noise occurring during manufacturing processes is not easily determined. In order to accommodate or adjust for white noise, the semiconductor industry conventionally utilizes a statistical process variance, or standard deviation, determined at optimal conditions, as an estimation of white noise. Thus, statistical process variance that is used as a substitute for what would otherwise be a truer (e.g., more real world) measurement of a general type of white noise is measured while the process, material to be processed, and processing device conditions are at an atypically pristine state. This type of measurement of white noise at pristine conditions yields a measurement during a best looking steady state performance, reflecting what cannot be controlled even at the best of conditions. The measurement at these atypical conditions is then utilized as an estimation of the white noise occurring throughout the manufacturing process under consideration.

The problem with the aforementioned conventional use of measurements at pristine conditions as a white noise estimate, despite its industry acceptance, is that it is not a reasonably accurate reflection of white noise that occurs during real manufacturing conditions. One of many reasons that measurements at pristine conditions do not reasonably reflect true conditions is that materials such as wafers processed in most front and back end processing devices in the semiconductor industry have relationships with or effects on subsequently processed wafers. Accordingly, for example, conditions applied to wafers that were previously processed in a processing device will have residual effects on wafers that are currently being processed in that processing device. An estimation of white noise derived from measurements taken while the processing device is at a steady state, consequently, does not reflect the fluctuations introduced during real-world run-to-run processing.

Regarding the aforementioned conventional techniques, statistical use of standard deviation in connection with observed deviation is illustrated, for example in "Statistical feedback control of a plasma etch process", P. Mozumder et al., *IEEE Transactions on Semiconductor Manufacturing*, Vol. 7, No. 1 (February 1994) (incorporated herein by reference). The statistical variance $S_k$ at the kth run is calculated using the standard deviation as:

$$s_k = \sqrt{\frac{1}{n-1}\left[\sum_{i=1}^{n} X_{k-i+1}^2 - n(\overline{X})^2\right]} \quad (1)$$

where
n = number of samples
X = deviation of observed value from predicted value As can be seen, the standard deviation calculation does not distinguish between systematic variation and white noise variation components of the error. Hence, conventionally both the systematic and white noise variations are controlled together, rather than separately.

The conventional process control system thus compares this observed "combined" standard deviation to a threshold in order to determine if the deviation is unacceptable. Once the standard deviation greater than the threshold is detected, a tuning procedure in the process model is invoked in order to appropriately control the deviation. In essence, standard deviation-based methods only act to control when the standard deviation range is outside a particular threshold or trigger. In the conventional process control method, the standard deviation is used to determine the level for the threshold or trigger. Within the threshold, it is assumed that the deviation cannot be sufficiently controlled.

Therefore, there remains a need to have improved control, particularly within a tolerance range associated with a target specification. There also remains a need to address the effects of run-to-run conditions on such measurements.

BRIEF SUMMARY OF THE INVENTION

The present invention provides a way to determine the "error" within standard deviation which is caused by two components: a white noise component and a systematic component. The white noise component is random noise and therefore is relatively non-controllable. The systematic component, in contrast, may be controlled by changing the control parameters. A ratio between the two components is calculated autoregressively. Based on the ratio and using the observed or measured error (as, e.g., typically made over the course of several measurements), the actual value of the error caused by the systematic component is calculated utilizing an autoregressive stochastic sequence. The actual value of this error is then used in determining how to change the control parameters. The autoregressive stochastic sequence addresses the issue of real-time control of the effects of run-to-run deviations, and provides a mechanism that can extract the white noise component from the statistical process variance in real time. This results in an ability to provide tighter control of feedback and feedforward variations and according to one or more embodiments of the present inventions, may be used in conjunction with a dynamic adaptation of estimated gain, estimation of recursive parameters, and dynamic filtration in searching for individual optimum vectors for example.

One potential use of one or more embodiments of the present invention is to provide an estimated gain adjustment which provides optimal weight factors via an autoregressive stochastic sequence.

In accordance with one or more embodiments of the invention, there is provided a computer-implemented method, system and/or a computer program product, for compensating for a variance between a measured characteristic of at least one product produced by a process and a target result of the characteristic, by differentiating a white noise component of the variance from a systematic component of the variance. An observed value is received for at least one product, and a target value is received for the product. A variance is determined between the observed value of at least one product and the target value of the at least one product. A first portion of the variance caused by white noise is determined. A second portion of the variance caused by a systematic component is determined. The first portion and/or second portions are used to adjust the process.

According to one or more embodiments of the invention, the products are semiconductor wafers, and the manufacturing process is an automated semiconductor manufacturing process.

According to one or more embodiments of the invention, the target value is derived from a specification, the specification being selected from at least one of a predetermined specification, and a real-time calculation taken from a plurality of prior observed values of products.

According to one or more embodiments of the invention, the process has at least one control parameter capable of being controlled; and the at least one control parameter is controlled during a process based on the second portion of the variance.

According to one or more embodiments of the invention, the value for each product of the plurality of products including the at least one product is determined; at least the second portion of the variance for the plurality of products is determined and the second portion of the variance is utilized as a threshold; and it is determined whether or not to perform the controlling step for the plurality of products when the observed value is outside the threshold.

According to one or more embodiments of the invention, the process includes at least one device on which the plurality of products including the at least one product is processed, the observed value being relative to the at least one device, the at least one device including the at least one control parameter; and controlling the at least one control parameter includes affecting the at least one device.

According to one or more embodiments of the invention, the process includes a plurality of devices including a first device and a second device on which the plurality of products including the at least one product are processed, the observed value being relative to the first device, the second device including the at least one control parameter; and controlling the at least one control parameter includes affecting at least the second device.

According to one or more embodiments of the present invention, the first portion and second portion are determined over two or more products.

According to one or more embodiments of the invention, the first portion and second portion of the variance are calculated using an autoregressive stochastic sequence.

According to one or more embodiments of the invention, the first portion and second portion of the variance are determined by:

$$\delta_x = y/(1+z)$$

where $\delta_x$=a value representing the variation that a system can control $\delta_w$=a value representing the random variation that is not controlled According to one or more embodiments of the invention, the white noise includes at least one of random variance, normal deviation, and an ambient fluctuation. Further, according to one or more embodiments of the invention, the first portion and second portion of the variance are calculated using an autoregressive stochastic sequence.

BRIEF DESCRIPTION OF THE SEVERAL VIEWS OF THE DRAWINGS

The above mentioned and other features and advantages of the present invention will become more readily apparent from the following detailed description and the accompanying drawings, in which.

DETAILED DESCRIPTION OF THE INVENTION

Figure 1:
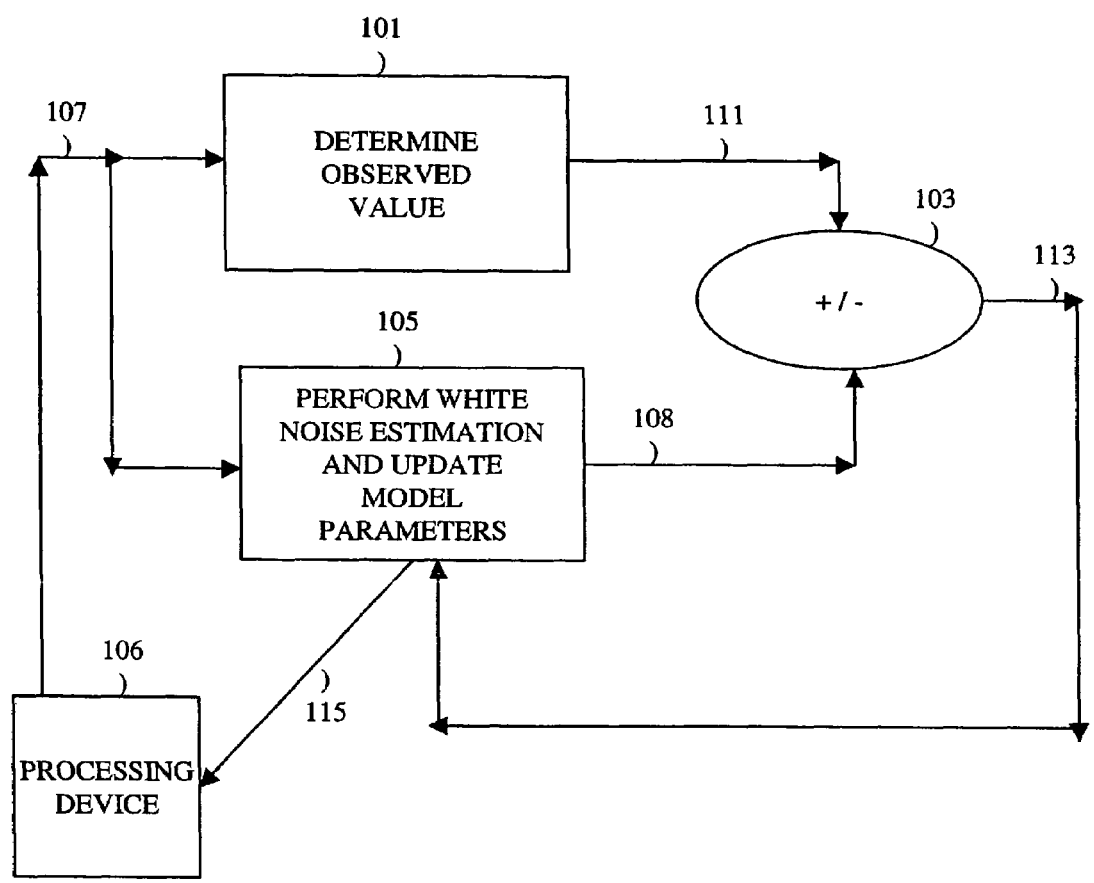
FIG. 1 is an example block diagram of recursive parameter estimation for use in connection with one or more embodiments of the present invention.

The following detailed description includes many specific details. The inclusion of such details is for the purpose of illustration only and should not be understood to limit the invention. Throughout this discussion, similar elements are referred to by similar numbers in the various figures for ease of reference. In addition, features in one embodiment may be combined with features in other embodiments of the invention.

Differentiating the uncontrollable white noise component generated by a processing device from the systematic component, such as controllable errors generated or experienced by the device, assists in identifying an area in which additional control and/or more precise control may be applied within a process control system.

As contemplated by one or more embodiments of the present invention, the value of the white noise component may be extracted from the statistical process variance, such as by utilizing an autoregressive stochastic sequence (such as the one described below). This permits tighter control, which according to one or more embodiments of the present invention is helpful in determining a dynamic threshold for tighter feedback and/or feed forward control, while taking into consideration the real time run-to-run conditions relating to the process, material, and/or processing device.

An $n^{th}$ order autoregressive stochastic sequence may be expressed as:

$$X_k = \rho_1 * X_{k-1} + \rho_2 * X_{k-2} + \ldots + \rho_n * X_{k-n} + W_k \quad (2)$$

where $W_k$=white noise $\rho_n$=auto-correlation coefficient at lag n $X_k$=deviation of observed value from predicted value at run k For the run-to-run control of the wafers:

$$X_k = \rho_1 * X_k - 1 + W_k \quad (3)$$

To extract the white noise component, the variance analysis may be taken in two steps according to one or more embodiments of the invention. First, $$V_x = \rho_1^2 * V_x + V_w \quad (4)$$

where $V_x$=variance of the signal $V_w$=variance of the white noise w=white noise x=signal Next, $$\delta_w/\delta_x = (1-\rho_1^2)^{0.5} \quad (5)$$

where $\delta$=standard deviation.

Equation (5) provides an estimated gain adjustment, which is intended in effect to provide optimal weight factors taking into consideration a persistence of error conditions which may affect current conditions. The adjustment has cascaded functions of the above-described autoregressive stochastic sequence of equation (2).

From the above, it can be observed that:

Current parameter=previous parameter estimate+ estimated gain*prediction error (6)

Equations (7), (8) and (9) provide the estimated gain, weight factor and standard deviation derived from samples of the previous wafers.

Estimated Gain=weight factor*Gain (7)

Weight factor=$f(\rho_1, \delta_n)$ (8)

where $\delta$=standard deviation from N samples of previous wafers $$\delta_N = \delta_x + \delta_w \quad (9)$$

From equation (5), the following can be derived:

$$\delta_N = y \quad (10)$$

where y=calculated value from N samples of the previous wafers and $$\delta_w/\delta_x = z \quad (11)$$

where z=calculated value from equation (5)

From equations (9), (10) and (11), it follows that:

$$\delta_x = y/(1+z) \quad (12)$$

where $\delta_x$=a value representing the variation that a system can control (i.e., the systematic component)

$\delta_w$=a value representing the random variation that is relatively non-controllable (i.e., the white noise component)

Wafers that have been processed in a sequence (run-to-run) by a given device or system typically have a relationship to each other in terms of a variance that they create. In summary, equation (3) is one example of taking into consideration the run-to-run control of wafers; it addresses information representative of the sequence and the relationship between the wafers and the sequence. Equation (4) follows from equations (2) and (3). Equation (5) concerns the ratio between the white noise component and the observed value. Based on the ratio between the white noise component and the observed value, it can be determined what the total amount of error is. By utilizing feed forward analysis, the process in which the error is observed can be appropriately controlled. Estimated gain factors are utilized, as shown in equations (7) and (8). Referring to equation (9), the observed value now has been differentiated into two components, one of which is the white noise component and the other of which is real deviation, also referred to as the systematic component. Equations (10) and (11) follow from the foregoing.

Consider for instance that a CMP processing device will be used in a semiconductor process control system to polish twenty-five wafers. $X_k$ is wafer twenty-four, $X_k\_1$ is wafer twenty-three, etc. Because of the relationship and effect run-to-run wafers have on each other, the analysis used herein refers back to the previous wafer(s) (i.e., $X_k\_1$, etc.) in determining how much control effectively may be applied to $X_k$, the wafer presently being processed.

Referring to FIG. 1, the measured values (or raw data from which these values can be generated) 107 for samples are obtained from, e.g., a processing device 106 and used by block 101 to determine an observed value and by the white noise estimator and update model parameter block 105. The estimator block 105 performs a white noise estimation, using, for example, the aforementioned auto-regressive stochastic sequence. Estimator block 105 then updates the model parameters (taking the white noise component into account), and produces the predicted value 108 as output, that is, what the measured value is expected to be. In contrast, the process block 101 merely produces an output indicative of the actual measured value 111. At block 103, the positive or negative difference between the predicted output 108 and the actual output 111 is determined. This difference is utilized as the predicted error 113, which is then input back into the estimator block 105 to be used as feedback in connection with the recursive parameter estimation. The estimator block 105 then utilizes the difference in the auto-regressive stochastic sequence (such as equation (2)) to update the model. The updated model parameters 115 are provided to the processing device 106, e.g., a CMP processing device, a CVD device, an etch device, etc.

According to one or more embodiments of the present invention, the white noise component is differentiated on a real time basis from systematic errors that occur during a manufacturing process. Alternatively, according to other embodiments, the differentiation is performed, but not on a real-time basis. The ability to differentiate the white noise component from the systematic component during real-time may be particularly useful within any number of industries (such as the semiconductor industry) in connection with obtaining higher quality, increased throughput, lower cost of operation, and shorter ramp-up time. Further, one or more embodiments of the present invention may provide more accurate determinations of error and may lead to improved test and yield analysis. One or more embodiments of the present invention are suitable for use in process control systems concerned with, for example, wafer-to-wafer thickness control, uniformity control, within-wafer range control, defect analysis and/or control, etch critical dimension control, chemical vapor deposition thickness and/or uniformity control, physical vapor deposition uniformity and/or thickness control, metrology variations, and other process control, analysis, and/or measurement situations and processing devices.

The following Table 1 illustrates simulated data comparing the calculation of a threshold using standard deviation to the calculation of a threshold with an embodiment of the present invention. In Table 1, the number of minimum samples is N=10.

TABLE 1

| Sample Number | Simulated Sample Value | Threshold with Standard Deviation | Threshold with the Invention |
|---|---|---|---|
| 1 | 3927 | | |
| 2 | 3893 | | |
| 3 | 3797 | | |
| 4 | 3713 | | |
| 5 | 3627 | | |
| 6 | 3602 | | |
| 7 | 3694 | | |
| 8 | 3732 | | |
| 9 | 3753 | | |
| 10 | 3781 | 45.0 | 14.1 |
| 11 | 3739 | 45.0 | 12.3 |
| 12 | 3694 | 45.0 | 9.2 |
| 13 | 3684 | 45.0 | 7.8 |

TABLE 1-continued

| Sample Number | Simulated Sample Value | Threshold with Standard Deviation | Threshold with the Invention |
|---|---|---|---|
| 14 | 3673 | 45.0 | 7.8 |
| 15 | 3743 | 45.0 | 7.9 |
| 16 | 3753 | 45.0 | 5.4 |
| 17 | 3746 | 45.0 | 5.1 |
| 18 | 3710 | 45.0 | 5.3 |
| 19 | 3736 | 45.0 | 5.3 |

As shown in the above example simulated data, the threshold in a conventional process control system utilizing a threshold calculated using standard deviation is calculated to be at 45.0. In other words, the conventional standard deviation approach utilizes a fixed threshold or trigger. Where the observed values are within the threshold, the process control system does not attempt to control the error, whereas if the values are outside the threshold, the process control system does attempt to control the error. In contrast, the threshold calculated utilizing the invention is dynamic and varies, thereby presenting a sensitive threshold in real-time for feedback and feedforward control. The threshold varies from 14.1 down to 5.1 in the simulated data in Table 1. Hence, the present invention offers a more sensitive detection and/or control of "true" errors than the conventional process control system utilizing a fixed threshold.

Values within the threshold can be neglected since they cannot be effectively controlled. On the other hand, outside the threshold it is possible and useful to control the deviation. The reason that one ignores the value below the threshold is that this represents the calculated white noise component, which is not controllable. Once the threshold has been defined more accurately, as with the present invention, better control can be provided.

Figure 2:
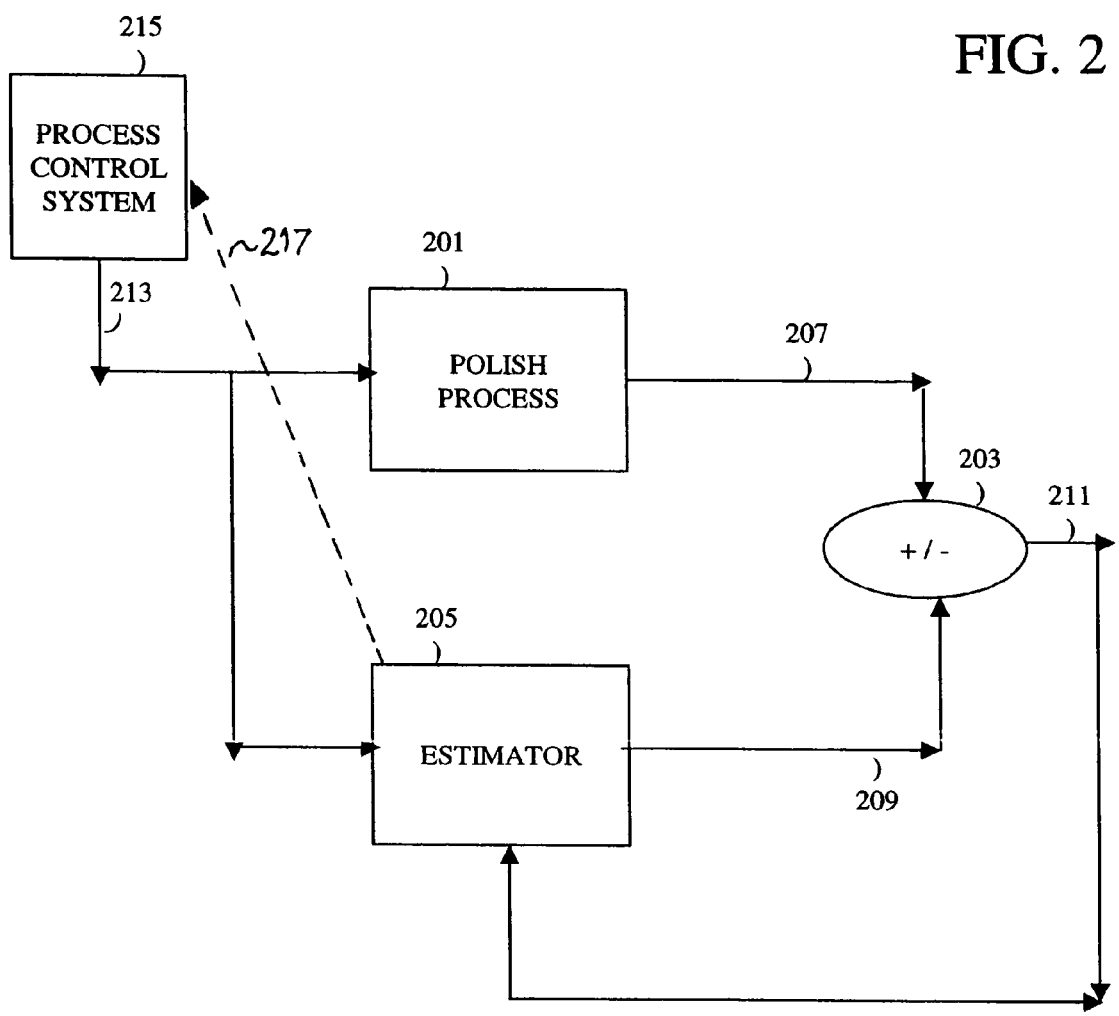
FIG. 2 is a block diagram of an example of the recursive parameter estimation, utilizing the invention illustrated in FIG. 1.

Reference is now made to FIG. 2, a block diagram illustrating use of one or more example embodiments of the present invention in connection with a chemical mechanical polishing ("CMP") process. However, it is not intended to limit the invention to CMP, as it can be applied in connection with a number of processes, such as chemical vapor deposition ("CVD"), or etching or many other processes within the semiconductor industry. Moreover, the present invention may also be used with types of process control systems, in addition to the semiconductor industry, which are concerned with measurement of true error (i.e., error not including white noise) as discriminated from observed error.

In the CMP process example of FIG. 2, the process control system 215 controls the conventional controls of pressure, state, time, flow rate, etc., in connection with the wafers that are to be polished. At block 201, the polish process receives the input wafers together with the parameters 213 describing the polish process. At block 205, the estimator receives from the process control system, parameters 213 describing the target result for the CMP polish process, performs a white noise estimation using an auto-regressive, stochastic sequence, updates the model parameters, and outputs the predicted value 209. The polish process block 201 obtains, determines and outputs observed, actual measurements 207 of the wafers, after they have been polished. The difference between the actual measurements and the predicted value from the estimator block 205 is determined in block 203. Block 203 determines the error in the prediction 211, which is then further input into the estimator block 205, to be used as feedback in connection with the recursive parameter estimation, e.g., to avoid overreacting to the noise which may be present in the observed, actual measurement. According to one or more embodiments of the invention, the noise is approximately extracted by the estimator block 205 utilizing the auto-regressive stochastic sequence discussed above. The updated model parameters 217 may be provided to the process control system 215, e.g., for further use.

Figure 3:
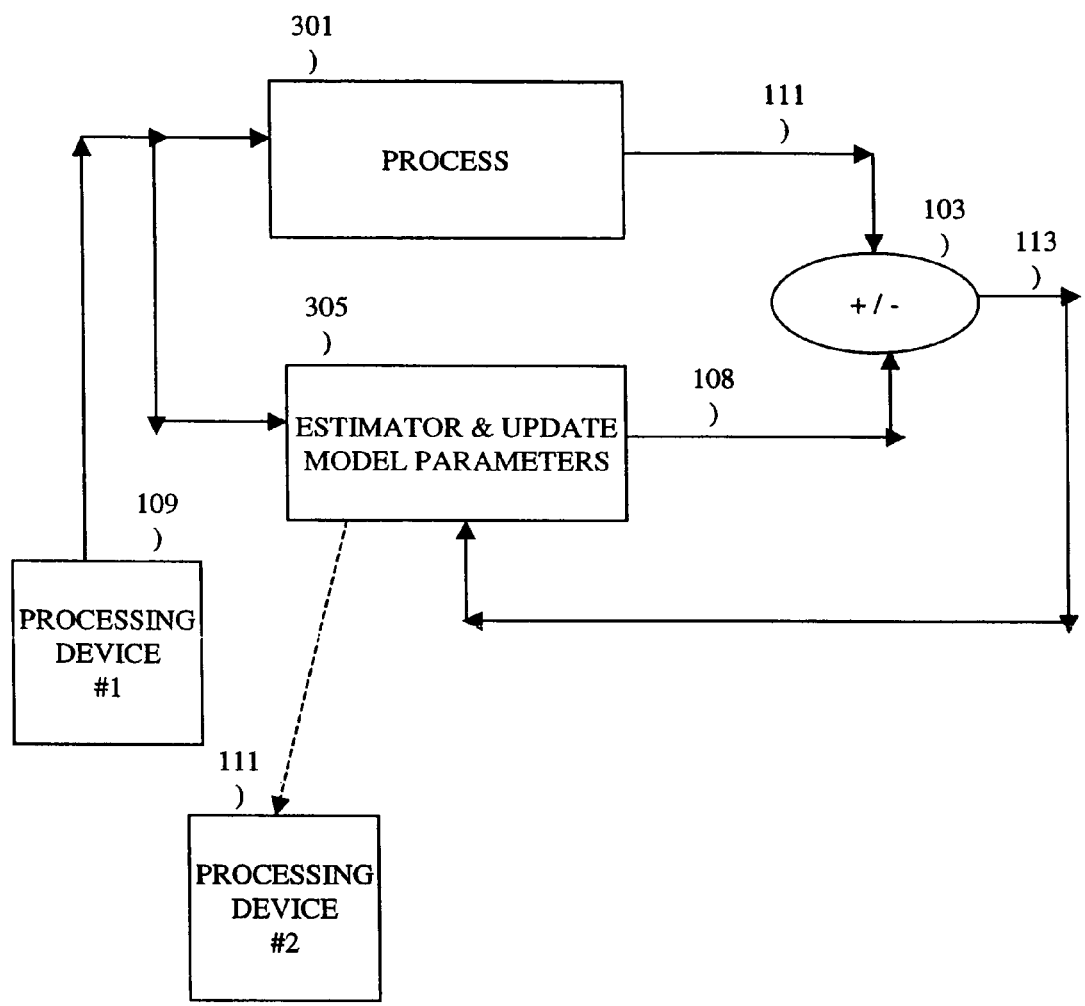
FIG. 3 is a block diagram of recursive parameter estimation, utilizing one or more embodiments of the present invention.

As an example of another use of one or more embodiments of the present invention, consider that a specification is provided which requires the process control system to produce wafers of a certain thickness, among other things, so that a target thickness is achieved. In this particular processing sequence example, shown in FIG. 3, two processing devices 109, 111 are utilized in sequence, so that the second processing device can compensate for the first processing device (e.g., CMP). Referring to FIG. 3, the process block 301 outputs the observed measurements obtained from the first processing device 109, in order to ultimately be used for making feedforward adjustments to the second processing device 111. Those outputs are utilized in determining the variance, or predicted error, at block 103 of the observed values from the predicted values. The predicted error is then utilized to make adjustments to the second processing device 111, after being adjusted for the white noise component via the estimator and update model parameters block 305, preferably utilizing the autoregressive stochastic sequence discussed above. By so doing, the second processing device compensates for deficiencies and variances caused by the first processing device, such that according to this example, the wafers produced from the second processing device are within the range of specified target thickness.

In the above description, the measurement of the products is described as being taken in relation to a pre-determined specification. Alternatively, according to one or more embodiments, the measurements could be taken in relation to a real-time calculation based on prior measurements. In accordance with at least one or more embodiments, multiple specifications could be provided.

Figure 4:
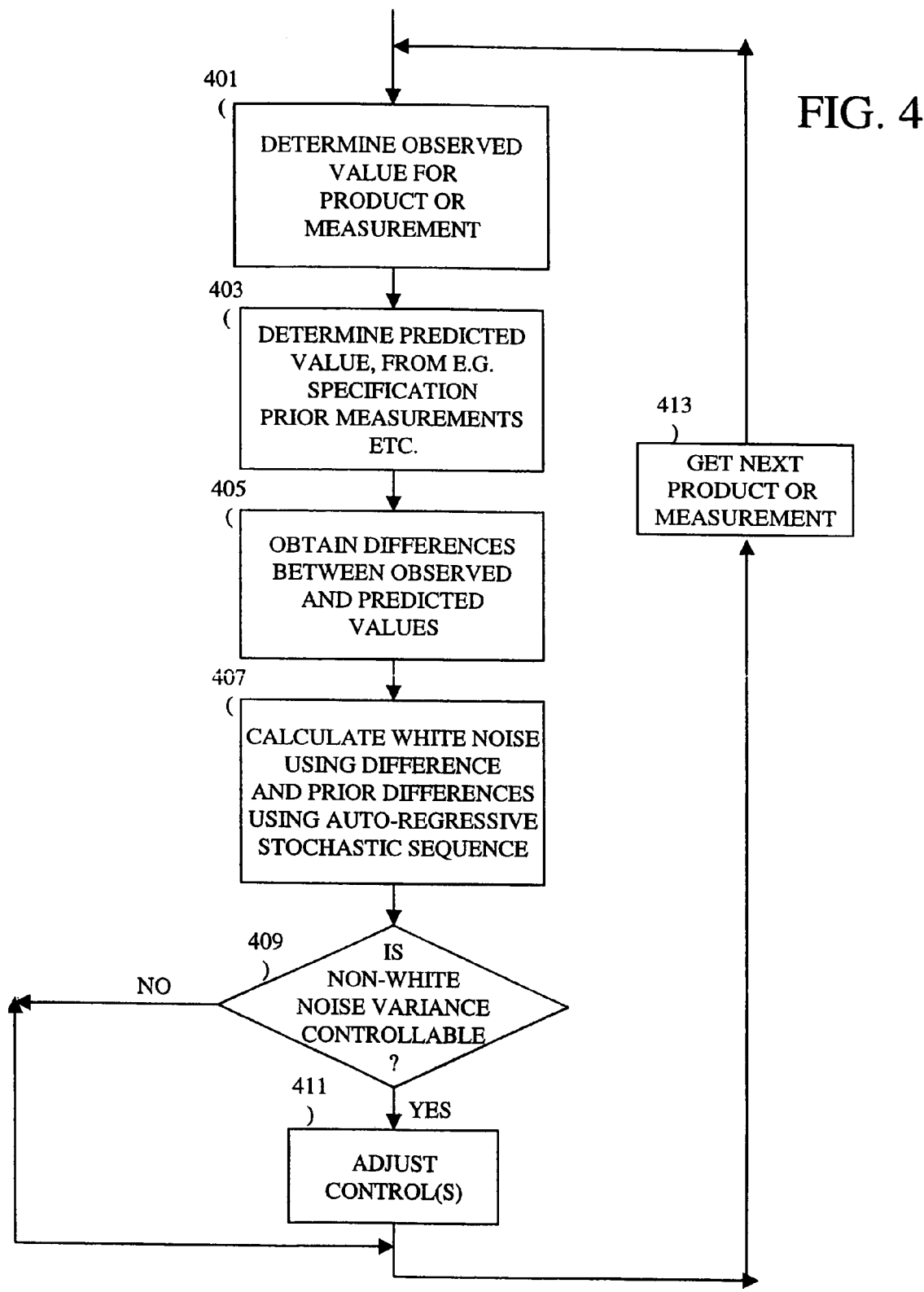
FIG. 4 is a flow chart of the recursive parameter estimation, utilizing the invention illustrated in FIG. 1.

FIG. 4 is a flow chart representing one or more embodiments of the present invention. At step 401, the observed value for the product (or other measurement) is determined. At step 403, the predicted value is determined, including for example from a specification or from a prior measurement, possibly incorporating white noise estimation as indicated in FIG. 1. At step 405, the difference, or predicted error, between the observed value and the predicted value is obtained. At step 407, the white noise component of the observed error is calculated, using the current and prior observed errors, in an auto-regressive, stochastic sequence. At step 409, it is determined whether the non-white noise component of the observed error is controllable, the system may adjust a control parameter 411. (For example, a gas pressure or temperature of the production environment might be adjusted, based on the systematic component.) At step 413, the system gets the next product to be measured, or obtains the next measurement.

Also, as described above, the difference between the measurements of the product, such as a wafer, and the specification for that product is calculated. However, the process control system may also calculate a statistical variance between such measurements and the specification. As described above, the specification could be pre-determined or could be based on a real-time calculation, such as determined by prior measurements.

From the difference or variance between observed values and predicted values, the process control system may, in effect, calculate two components, as explained above. The first component is indicative of that portion of the difference caused by random noise, random variance, and/or normal deviation. The second component determined by the system is indicative of the difference or variation caused by a systematic error or systematic variance over two or more products. Both the first and second components are calculated from a statistical variance.

If the actual variance exceeds a threshold, the process control system then may or may not attempt to control the process. For example, the process control system may adjust one or more control parameters that affect the process and that are relevant to the processing device, such as gas pressure, temperature, etc., thereby controlling the production environment. Hence, the process may be more tightly controlled, based upon the calculated second component of the differences or variance.

Other parameters that can be controlled in connection with semiconductor manufacturing include applying or changing electrical power, placing different gases into a chamber, changing distances between electrodes, etc. There are numerous variables in semi-conductor manufacturing that are to be measured and variances that may be controlled. The present invention is suitable for use in these situations.

This invention is described in connection with the semiconductor manufacturing industry. It can be used with other industries as well, particularly those that utilize measurements in an attempt to control variance in a process control system. The invention concerns determining, preferably but not necessarily in real-time, how much variance in a process control system can or cannot be controlled. According to one or more embodiments, the present invention determines how much of the standard deviation can be reduced and controlled.

Figure 5:
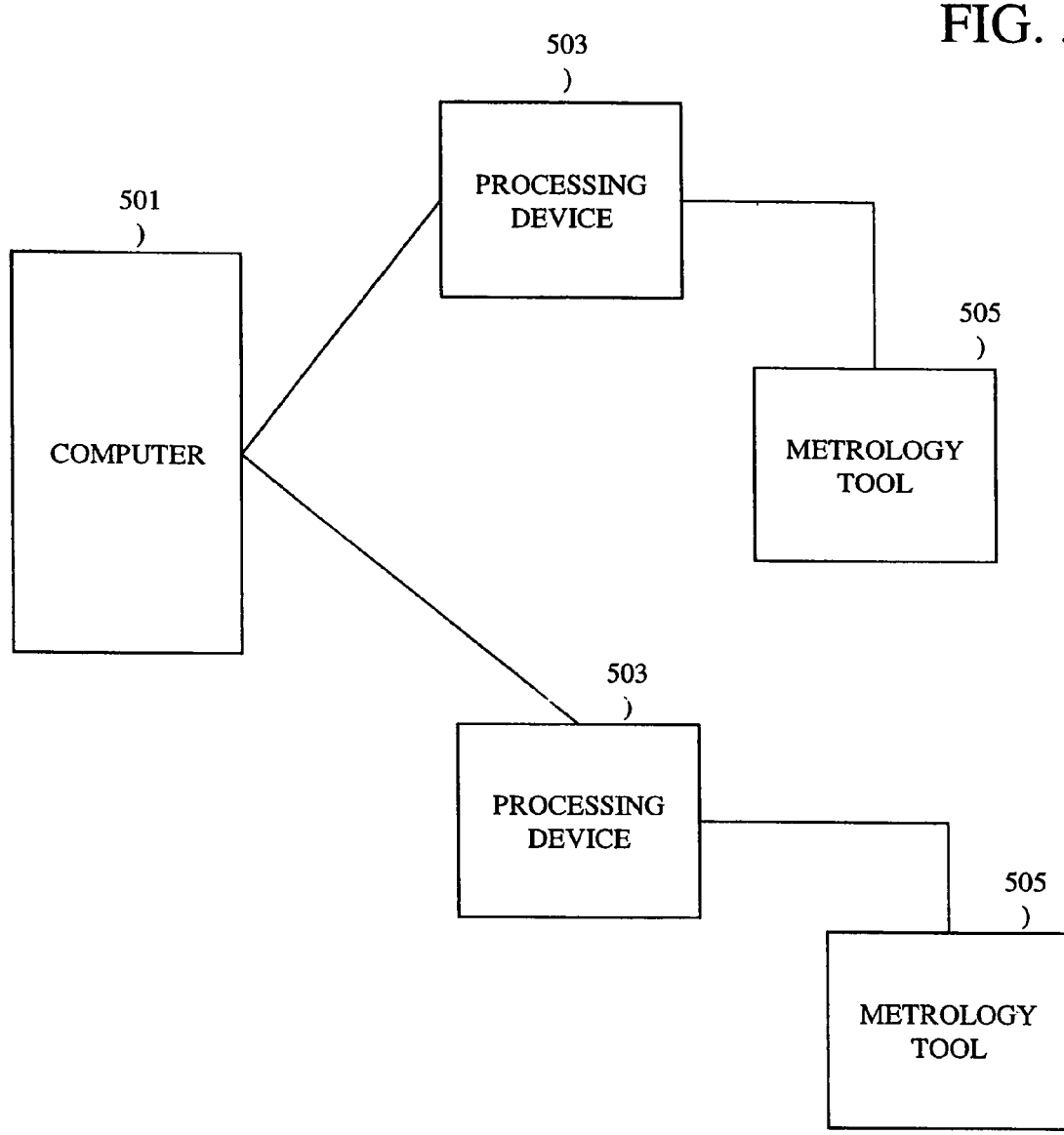
FIG. 5 is a block diagram of a computerized process control system which may be used in connection with one or more embodiments of the present invention.

The process control system used in connection with operation of one or more embodiments of the present invention may include a general purpose computer 501 as illustrated in FIG. 5, or a specially programmed special purpose computer. It may also be implemented as a distributed computer system rather than a single computer; some of the distributed systems might included embedded systems. Further, the programming may be distributed among one or more processing devices 503 themselves or other parts of the process control system. Similarly, the processing could be controlled by a software program on one or more computer systems or processors, or could be partially or wholly implemented in hardware. Moreover, the process control system may communicate directly or indirectly with the relevant processing devices and/or components thereof, such as metrology tools 505. As another alternative, the portion of the process control system that is relevant may be embedded in the processing device itself.

Deviation has been described herein as controlled above a certain threshold. In certain situations, it would be appropriate to consider deviation as controllable in an inverse manner. In other situations, deviation may have a range, above and below which control is possible.

Furthermore, it is possible that the invention could be used in connection with processes that are not part of a process control system, but that use multiple measurements and that are susceptible to white noise. One example is the financial industry, where fluctuations in values over time may be due to some uncontrollable influences, for which a dynamic and/or more precise threshold may be calculated and/or adjustments made.

Figure 6:
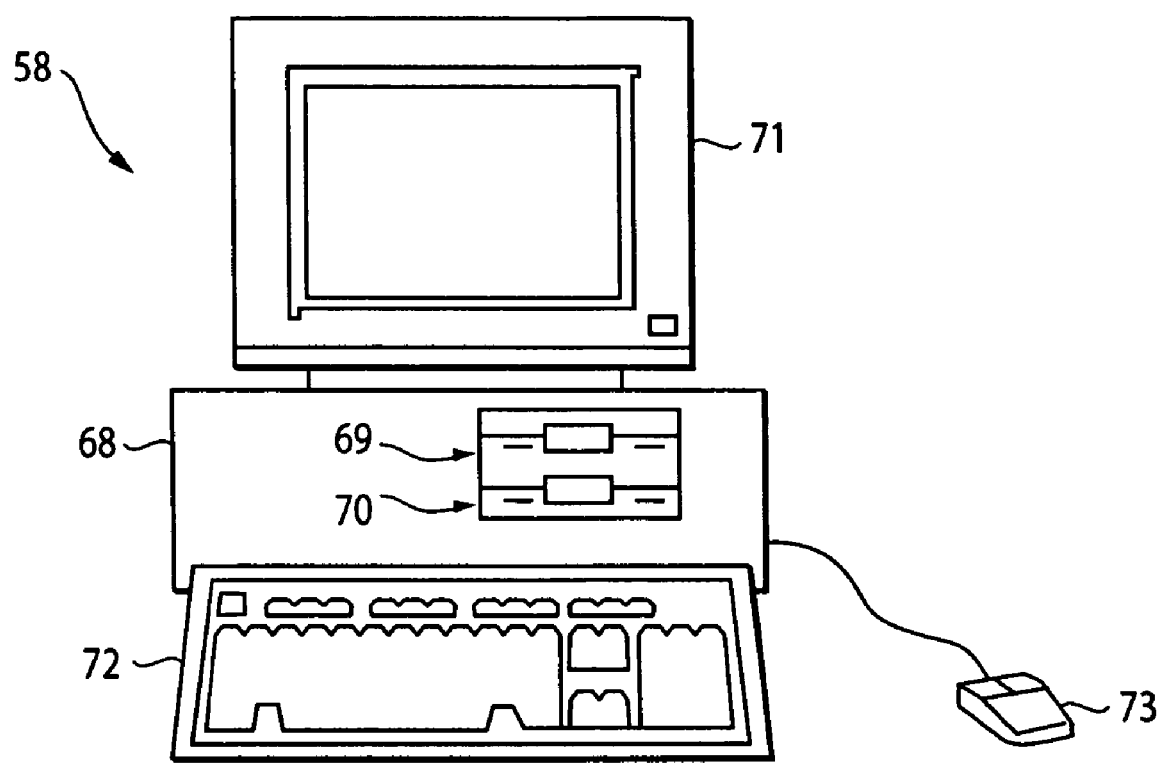
FIG. 6 is an illustration of a computer appropriate for use in connection with one or more embodiments of the present invention.

FIG. 6 is an illustration of a computer 58 used for implementing the computer processing in accordance with a computer-implemented embodiment of the present invention. The procedures described above may be presented in terms of program procedures executed on, for example, a computer or network of computers.

Viewed externally in FIG. 6, computer 58 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Figure 7:
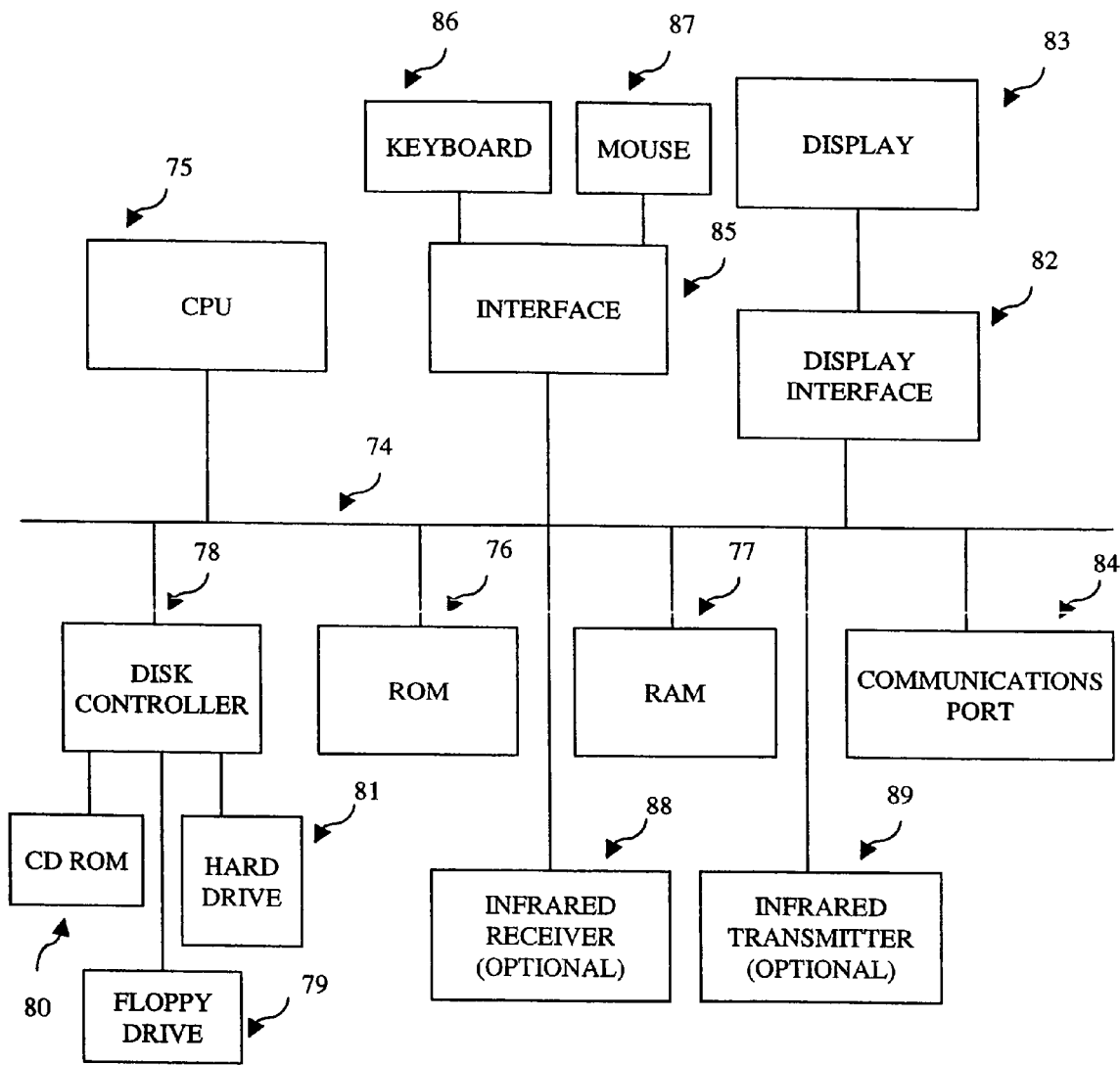
FIG. 7 is a block diagram illustrating the internal hardware of FIG. 6.

FIG. 7 illustrates a block diagram of the internal hardware of the computer of FIG. 6. CPU 75 is the central processing unit of the system, performing calculations and logic operations required to execute a program. Read only memory (ROM) 76 and random access memory (RAM) 77 constitute the main memory of the computer. Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices occurs using communications port 84.

In addition to the standard components of the computer, the computer may also include an interface 85, which allows for data input through the keyboard 86 or pointing device, such as a mouse 87.

As an example, the process control system may incorporate a factory automation system with a general purpose computer, or a specially programmed special purpose computer. It may also be implemented to include a distributed computer system rather than as a single computer; some of the distributed system might include embedded systems. Further, the programming may be distributed among processing devices and metrology tools and/or other parts of the process control system. Similarly, the processing could be controlled by a software program on one or more computer systems or processors, or could be partially or wholly implemented in hardware. Moreover, the factory automation system may communicate directly or indirectly with the relevant metrology tool(s), processing device(s), and metrology system(s); or the metrology tool(s), processing device(s) and metrology system(s) may communicate directly or indirectly with each other and the factory automation system.

As another example, the system may be implemented on a web based computer, e.g., via an interface to collect and/or analyze data from many sources. It may be connected over a network, e.g., the Internet, an Intranet, or even on a single computer system. Moreover, portions of the system may be distributed (or not) over one or more computers, and some functions may be distributed to other hardware, such as tools, and still remain within the scope of this invention. The user may interact with the system via e.g., a personal computer or over PDA, e.g., the Internet, an intranet, etc. Either of these may be implemented as a distributed computer system rather than a single computer. Similarly, a communications link may be a dedicated link, a modem over a POTS line, and/or any other method of communicating between computers and/or users. Moreover, the processing could be controlled by a software program on one or more computer systems or processors, or could even be partially or wholly implemented in hardware.

User interfaces may be developed in connection with an HTML display format. It is possible to utilize alternative technology for displaying information, obtaining user instructions and for providing user interfaces.

The invention has been discussed in connection with particular examples. However, the principles apply equally to other examples and/or realizations. For example, particular semi-conductor processes such as chemical vapor deposition were discussed, although the invention may be performed in connection with other semi-conductor processes. In addition, one or more embodiments of the invention are useful with systems not related to semi-conductor, in which processing adjustments are made and processing may benefit from distinguishing white noise. Such systems include, by way of example, systems for producing optical lenses, systems for controlling room temperature, and/or systems for controlling water temperature.

The system used in connection with the invention may rely on the integration of various components including, as appropriate and/or if desired, hardware and software servers, database engines, and/or other process control components. The configuration may be, alternatively, network-based and may, if desired, use the Internet as an interface with the user.

The system according to one or more embodiments of the invention may store collected information in a database. An appropriate database may be on a standard server, for example, a small Sun™ Sparc™ or other remote location. The information may, for example, optionally be stored on a platform that may, for example, be UNIX-based. The various databases maybe in, for example, a UNIX format, but other standard data formats may be used.

Although the process control system is illustrated as having a single computer, the system according to one or more embodiments of the invention is optionally suitably equipped with a multitude or combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, one or more embedded processors, as well as processing system network combinations of the same. Further, portions of the system may be provided in any appropriate electronic format, including, for example, provided over a communication line as electronic signals, provided on floppy disk, provided on CD Rom, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

The invention may include a process and/or steps. Where steps are indicated, they may be performed in any order, unless expressly and necessarily limited to a particular order. Steps that are not so limited may be performed in any order.

While this invention has been described in conjunction with the specific embodiments outlined above, many alternatives, modifications and variations will be apparent to those skilled in the art. Accordingly, the preferred embodiments of the invention as set forth are intended to be illustrative and not limiting. Various changes may be made without departing from the spirit and scope of the invention as defined in the application. The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the application.

What is claimed is:

1. A system, implemented on at least one computer, for compensating for a measurement of error between a measured characteristic of at least one product produced by a process and a target result of the characteristic, the system comprising:
   (a) means for receiving at least one observed value for at least one product, and receiving a target value for the at least one product;
   (b) means for determining a first measurement of error between the at least one observed value of the at least one product and the target value of the at least one product;
   (c) means for determining a white noise portion of the first measurement of error caused by white noise; and
   (d) means for using the determined white noise portion to adjust the process to reduce a second measurement of error.

2. The system of claim 1, wherein the at least one product is a semi-conductor wafer, and the process is an automated semiconductor manufacturing process.

3. The system of claim 1, wherein the target value is derived from a specification, the specification being selected from at least one of a predetermined specification, and a real-time calculation taken from a plurality of prior observed values of products.

4. The system of claim 1, wherein the process is associated with at least one control parameter capable of being controlled, further comprising means for controlling the at least one control parameter during the process based on the white noise portion of the first measurement of error.

5. The system of claim 4, wherein the system receives a plurality of observed values for a plurality of products including the at least one product, and determines the first measurement of error between the plurality of observed values and the target value, the system further comprises:
   means for utilizing the white noise portion of the first measurement of error as a threshold and determining whether or not to control the at least one control parameter when at least one of the plurality of observed values is outside the threshold.

6. The system of claim 4, wherein the process comprises a first device and a second device on which a plurality of products including the at least one product are processed, the at least one observed value being relative to the first device, the second device being associated with the at least one control parameter, wherein controlling the at least one control parameter comprises affecting at least the second device.

7. The system of claim 1, wherein the first measurement of error is a variance, and the white noise portion of the first measurement of error is calculated using an autoregressive stochastic sequence.

8. The system of claim 1, wherein the white noise portion of the first measurement of error is substantially determined by:

$$\delta_x = y/(1+z)$$

where $\delta_x$=a value representing a variation that a system can control
y=calculated value from previous values
z=estimated gain adjustment.

9. A system, implemented on at least one computer, for compensating for a measurement of error between a measured characteristic of at least one product produced by a process and a target result of the characteristic, the system comprising:
   (a) a value receiving component for receiving at least one observed value for at least one product, and receiving a target value for the at least one product;
   (b) a data repository for storing the observed value and the target value;
   (c) an error determination component configured to determine a first measurement of error between the observed value of at least one product and the target value of the at least one product;
   (d) a white noise estimator component configured to determine a white noise portion of the first measurement of error caused by white noise; and
   (e) a process adjustment component configured to adjust the process to reduce a second measurement of error using the determined white noise portion.

10. The system of claim 9, wherein the at least one product is a semi-conductor wafer, and the process is an automated semiconductor manufacturing process.

11. The system of claim 9, wherein the target value is derived from a specification, the specification being selected from at least one of a predetermined specification, and a real-time calculation taken from a plurality of prior observed values of products.

12. The system of claim 9, wherein the process is associated with at least one control parameter capable of being controlled, further comprising a controller configured to control the at least one control parameter during the process based on the white noise portion of the first measurement of error.

13. The system of claim 12, wherein the value receiving component is configured to receive a plurality of observed values for a plurality of products including the at least one product, and the error determination component is configured to determine the first measurement of error between the plurality of observed values and the target value, the system further comprises:
   control determination component configured to utilize the white noise portion of the first measurement of error as a threshold and determine whether or not to control the at least one control parameter when at least one of the plurality of observed values is outside the threshold.

14. The system of claim 12, wherein the process comprises a first device and a second device on which a plurality of products including the at least one product are processed, the at least one observed value being relative to the first device, the second device being associated with the at least one control parameter, wherein controlling the at least one control parameter comprises affecting at least the second device.

15. The system of claim 9, wherein the first measurement of error is a variance, and the white noise portion of the first measurement of error is calculated using an autoregressive stochastic sequence.

16. The system of claim 9, wherein the white noise portion of the first measurement of error is substantially determined by:

$$\delta_x = y/(1z)$$

where $\delta_x$ = a value representing a variation that a system can control
y = calculated value from previous values
z = estimated gain adjustment.

17. A computer-implemented method for compensating for a measurement of error between a measured characteristic of at least one product produced by a process and a target result of the characteristic, the method comprising:
(a) receiving at least one observed value for at least one product, and receiving a target value for the at least one product;
(b) determining a first measurement of error between the at least one observed value of the at least one product and the target value of the at least one product;
(c) determining a white noise portion of the first measurement of error caused by white noise; and
(d) using the determined white noise portion to adjust the process to reduce a second measurement of error.

18. The method of claim 17, wherein the at least one product is a semi-conductor wafer, and the process is an automated semiconductor manufacturing process.

19. The method of claim 17, wherein the target value is derived from a specification, the specification being selected from at least one of a predetermined specification, and a real-time calculation taken from a plurality of prior observed values of products.

20. The method of claim 17, wherein the process is associated with at least one control parameter capable of being controlled, the method further comprises controlling the at least one control parameter during the process based on the white noise portion of the first measurement of error.

21. The method of claim 20,
wherein receiving at least one observed value for at least one product comprises receiving a plurality of observed values for a plurality of products including the at least one product;
wherein determining a first measurement of error between the at least one observed value and the target value comprises determining a first measurement of error between the plurality of observed values and the target value,
the method further comprises utilizing the white noise portion of the first measurement of error as a threshold and determining whether or not to control the at least one control parameter when at least one of the plurality of observed values is outside the threshold.

22. The method of claim 20, wherein the process comprises a first device and a second device on which a plurality of products including the at least one product are processed, the at least one observed value being relative to the first device, the second device being associated with the at least one control parameter, wherein controlling the at least one control parameter comprises affecting at least the second device.

23. The method of claim 17, wherein the first measurement of error is a variance, and the white noise portion of the first measurement of error is calculated using an autoregressive stochastic sequence.

24. The method of claim 17, wherein the white noise portion of the first measurement of error is substantially determined by:

$$\delta_y = y/(1z)$$

where $\delta_x$ = a value representing a variation that a system can control
y = calculated value from previous values
z = estimated gain adjustment.

25. A computer program product for use in compensating for a measurement of error between a measured characteristic of at least one product produced by a process and a target result of the characteristic, the computer program product comprising:
(a) at least one computer readable medium, readable by the manufacturing process;
(b) instructions, provided on the at least one computer readable medium, for receiving at least one observed value for at least one product, and receiving a target value for the at least one product;
(c) instructions, provided on the at least one computer readable medium, for determining a first measurement of error between the at least one observed value of the at least one product and the target value of the at least one product;
(d) instructions, provided on the at least one computer readable medium, for determining a white noise portion of the first measurement of error caused by white noise; and
(e) instructions, provided on the at least one computer readable medium, for using the determined white noise portion to adjust the process to reduce a second measurement of error.

26. The computer program product of claim 25, wherein the at least one product is a semi-conductor wafer, and the process is an automated semiconductor manufacturing process.

27. The computer program product of claim 25, wherein the target value is derived from a specification, the specification being selected from at least one of a predetermined specification, and a real-time calculation taken from a plurality of prior observed values of products.

28. The computer program product of claim 25, wherein the process is associated with at least one control parameter capable of being controlled, further comprising instructions, provided on the computer readable medium, for controlling the at least one control parameter during the process based on the white noise portion of the first measurement of error.

29. The computer program product of claim 28, further comprising instructions, provided on the computer readable medium, for receiving a plurality of observed values for a plurality of products including the at least one product, determining a white noise portion of a first measurement of error between the plurality of observed values and the target value caused by white noise and utilizing the white noise portion as a threshold, and determining whether or not to control the at least one control parameter when at least one of the plurality of observed values is outside the threshold.

30. The computer program product of claim 28, wherein the process comprises a first device and a second device on which a plurality of products including the at least one product are processed, the at least one observed value being relative to the first device, the second device being associated with the at least one control parameter, wherein the instructions for controlling the at least one control parameter comprises affecting at least the second device.

31. The computer program product of claim 25, wherein the first measurement of error is a variance, and the white noise portion of the first measurement of error is calculated using an autoregressive stochastic sequence.

32. The computer program product of claim 25, wherein the white noise portion of the first measurement of error is substantially determined by:

$$\delta_x = y/(1z)$$

where $\delta_x$=a value representing a variation that a system can control
y=calculated value from previous values
z=estimated gain adjustment.

* * * * *